United States Patent
Nakamura et al.

(10) Patent No.: US 9,136,976 B2
(45) Date of Patent: Sep. 15, 2015

(54) WIRELESS COMMUNICATION APPARATUS AND WIRELESS COMMUNICATION METHOD

(75) Inventors: Hitoshi Nakamura, Tokyo (JP); Hiroyuki Shigei, Tokyo (JP); Haruhiko Yata, Kanagawa (JP); Takeshi Itagaki, Tokyo (JP); Tomoya Yamaura, Tokyo (JP); Katsunori Honma, Tokyo (JP); Nobuaki Kawai, Tokyo (JP); Hidekazu Kamimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 608 days.

(21) Appl. No.: 13/392,755

(22) PCT Filed: Aug. 30, 2010

(86) PCT No.: PCT/JP2010/064672
§ 371 (c)(1),
(2), (4) Date: Feb. 27, 2012

(87) PCT Pub. No.: WO2011/027726
PCT Pub. Date: Mar. 10, 2011

(65) Prior Publication Data
US 2012/0155518 A1 Jun. 21, 2012

(30) Foreign Application Priority Data
Sep. 4, 2009 (JP) .................................. 2009-204892

(51) Int. Cl.
*H04L 25/49* (2006.01)
*H04L 1/00* (2006.01)
(Continued)

(52) U.S. Cl.
CPC .............. *H04L 1/0007* (2013.01); *H04L 47/36* (2013.01); *H04L 27/2602* (2013.01);
(Continued)

(58) Field of Classification Search
CPC .......................... H04W 24/00; H04L 27/2647
USPC .......................... 375/219, 295, 227, 296, 224
See application file for complete search history.

(56) References Cited

U.S. PATENT DOCUMENTS 5,751,935 A * 5/1998 Kojima et al. .................. 714/6.1
6,094,465 A * 7/2000 Stein et al. ..................... 375/346
(Continued)

FOREIGN PATENT DOCUMENTS

CN 1525708 A 9/2004
JP 2001267960 A 9/2001
(Continued)

OTHER PUBLICATIONS

International Search Report, PCT/JP2010/064672, dated Nov. 2, 2010.

(Continued)

*Primary Examiner* — Parth Patel
(74) *Attorney, Agent, or Firm* — Hazuki International, LLC

(57) ABSTRACT

[Object] To prevent or reduce the degradation in transmission characteristics caused by fast fading (fluorescent lamp interference) to achieve optimized throughput.
[Solution] A process for detecting fast fading (fluorescent lamp interference) is performed (ST2). Fast fading is detected by, for example, detecting a variable light source whose frequency is twice the frequency of an alternating current power supply. When fast fading is detected, a frame length update process is performed (ST3, ST4). In the case of "subject transmission" in which the subject apparatus is the transmitter of a data frame, the setting of the maximum number of aggregations in frame aggregation (A-MPDU, A-MSDU) is changed to "the recommended maximum number of aggregations". "The recommended maximum number of aggregations" is set in advance so that the UDP throughput can be maximized under the conditions where fast fading has occurred. In the case of "subject reception" in which the subject apparatus is the receiver of a data frame, the subject apparatus sends a request message for limiting the maximum transmission length to the communication counterpart apparatus.

10 Claims, 27 Drawing Sheets

(51) Int. Cl.

| | | |
|---|---|---|
| *H04L 12/805* | (2013.01) | |
| *H04W 24/00* | (2009.01) | |
| *H04W 28/04* | (2009.01) | |
| *H04W 28/06* | (2009.01) | |
| *H04W 28/18* | (2009.01) | |
| *H04W 84/12* | (2009.01) | |
| *H04L 27/26* | (2006.01) | |
| *H04L 12/801* | (2013.01) | |

(52) U.S. Cl.
CPC ........ *H04L 27/2626* (2013.01); *H04L 27/2647* (2013.01); *H04L 47/14* (2013.01); *H04W 24/00* (2013.01); *H04W 28/04* (2013.01); *H04W 28/06* (2013.01); *H04W 28/18* (2013.01); *H04W 84/12* (2013.01)

(56) References Cited

U.S. PATENT DOCUMENTS

| | | | |
|---|---|---|---|
| 6,208,620 B1* | 3/2001 | Sen et al. | 370/231 |
| 6,359,935 B1* | 3/2002 | Hui et al. | 375/262 |
| 6,400,731 B1* | 6/2002 | Nitta | 370/468 |
| 6,961,393 B1* | 11/2005 | Cupo et al. | 375/343 |
| 7,068,628 B2 | 6/2006 | Li et al. | |
| 7,515,714 B2* | 4/2009 | Orihashi et al. | 380/255 |
| 7,643,404 B2 | 1/2010 | Li et al. | |
| 7,688,798 B2* | 3/2010 | Dottling et al. | 370/345 |
| 8,064,913 B2* | 11/2011 | Gummadi et al. | 455/441 |
| 8,121,022 B2 | 2/2012 | Li et al. | |
| 8,259,647 B2* | 9/2012 | Shao et al. | 370/328 |
| 8,611,288 B1* | 12/2013 | Zhang et al. | 370/329 |
| 2001/0014121 A1* | 8/2001 | Kaye et al. | 375/240.03 |
| 2001/0022808 A1* | 9/2001 | Komatsu | 375/148 |
| 2002/0018443 A1* | 2/2002 | Vleesschauwer et al. | 370/229 |
| 2002/0150048 A1* | 10/2002 | Ha et al. | 370/231 |
| 2002/0176482 A1* | 11/2002 | Chien | 375/132 |
| 2003/0101387 A1* | 5/2003 | Lee | 714/704 |
| 2003/0231581 A1* | 12/2003 | Son | 370/208 |
| 2004/0052315 A1* | 3/2004 | Thielecke et al. | 375/299 |
| 2004/0120415 A1* | 6/2004 | Song et al. | 375/262 |
| 2004/0157595 A1* | 8/2004 | Kruger | 455/423 |
| 2004/0170152 A1* | 9/2004 | Nagao et al. | 370/338 |
| 2004/0240453 A1* | 12/2004 | Ikeda et al. | 370/395.21 |
| 2004/0258092 A1* | 12/2004 | Sugaya | 370/474 |
| 2004/0267983 A1* | 12/2004 | Oda | 710/56 |
| 2005/0094709 A1* | 5/2005 | Lakkis | 375/130 |
| 2005/0099978 A1* | 5/2005 | Chandra et al. | 370/338 |
| 2005/0163070 A1* | 7/2005 | Farnham et al. | 370/328 |
| 2006/0223585 A1* | 10/2006 | Legg | 455/560 |
| 2007/0064662 A1* | 3/2007 | Bultan et al. | 370/338 |
| 2007/0173278 A1* | 7/2007 | Yoon et al. | 455/522 |
| 2007/0189237 A1* | 8/2007 | Jaatinen et al. | 370/335 |
| 2007/0189242 A1* | 8/2007 | Hosokawa et al. | 370/338 |
| 2007/0195893 A1* | 8/2007 | Kim et al. | 375/240.27 |
| 2007/0280130 A1* | 12/2007 | Matsuo | 370/252 |
| 2008/0045234 A1* | 2/2008 | Reed | 455/456.1 |
| 2008/0130795 A1* | 6/2008 | Chang et al. | 375/329 |
| 2008/0130801 A1* | 6/2008 | Wang | 375/345 |
| 2008/0186918 A1* | 8/2008 | Tinnakornsrisuphap et al. | 370/331 |
| 2008/0233958 A1* | 9/2008 | Robbins et al. | 455/436 |
| 2009/0274105 A1* | 11/2009 | Choi et al. | 370/329 |
| 2009/0323771 A1* | 12/2009 | Zhen et al. | 375/141 |
| 2010/0049819 A1* | 2/2010 | Hamada et al. | 709/207 |
| 2010/0110916 A1* | 5/2010 | Pratt et al. | 370/252 |
| 2010/0183087 A1* | 7/2010 | Hosokawa et al. | 375/262 |

FOREIGN PATENT DOCUMENTS

| | | |
|---|---|---|
| JP | 2002-044051 A | 2/2002 |
| JP | 2002101151 A | 4/2002 |
| JP | 2004260658 A | 9/2004 |
| JP | 2009010552 A | 1/2009 |
| WO | 2005099103 A1 | 10/2005 |
| WO | 2009011126 A1 | 1/2009 |

OTHER PUBLICATIONS

Office Action from Japanese Application No. 2009-204892, dated Mar. 25, 2014.
Office Action from Chinese Application No. 2010-80046755.5, dated Mar. 26, 2014.
Abduladhim Ashtaiwi, et al, Utilizing IEEE 802,11n to Enhance Qos support in Wireless Mesh Networks. Oct. 17, 2008.

* cited by examiner

FIG. 11
(a)
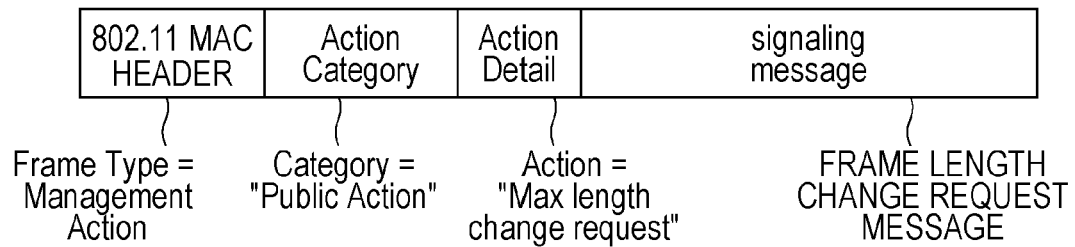
(b)
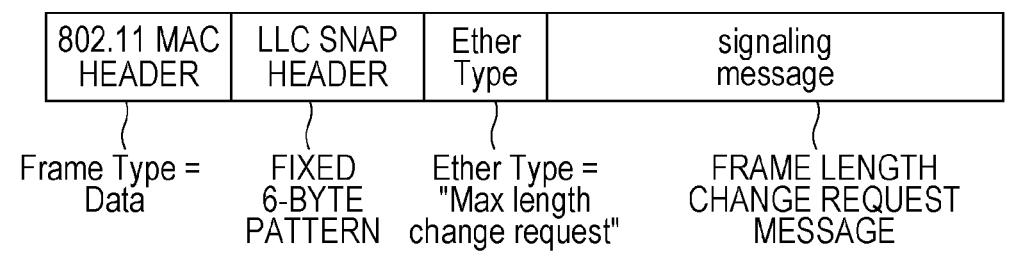

| MAXIMUM-LENGTH SPECIFYING TYPE | MAXIMUM-LENGTH PARAMETER |
|---|---|

(b)

MAXIMUM-LENGTH SPECIFYING TYPE

00...SPECIFICATION WITH TOTAL NUMBER OF BYTES
01...SPECIFICATION WITH NUMBER OF AGGREGATIONS COMBINED
02...SPECIFICATION WITH TOTAL TRANSMISSION TIME
03...TXOP limit (c)

MAXIMUM-LENGTH PARAMETER

SPECIFY IMMEDIATE VALUE IN DIFFERENT UNITS DEPENDING ON SPECIFIED TYPE
00...~ byte
01...~ PACKET
02...~ usec
03...~ usec

PLEASE SET MAXIMUM NUMBER OF
AGGREGATE PACKETS.

Help:
IF THE PERFORMANCE IS NOT SATISFACTORY,
THE PERFORMANCE MAY BE INCREASED
BY SETTING THE ABOVE NUMBER TO AN
APPROPRIATE VALUE.
GENERALLY, SATISFACTORY PERFORMANCE IS
OBTAINED BY SETTING THE MAXIMUM VALUE.
HOWEVER, DEPENDING ON THE ENVIRONMENT,
MAXIMUM PERFORMANCE MAY BE OBTAINED
BY SETTING ABOUT VALUE 4.

FIG. 17

(a)
IS A FLUORESCENT LAMP (NON-INVERTER TYPE) LOCATED BETWEEN AP AND TV?

◉ YES
○ NO (b)
DO YOU WANT TO MAKE THE MAXIMUM-NUMBER-OF-AGGREGATIONS LIMITATION FUNCTION ACTIVE?

◉ YES
○ NO

Help:
IF THE PERFORMANCE IS NOT SATISFACTORY, THE PERFORMANCE MAY BE INCREASED BY MAKING THE ABOVE FUNCTION ACTIVE.

WIRELESS COMMUNICATION APPARATUS AND WIRELESS COMMUNICATION METHOD

CROSS-REFERENCE TO RELATED APPLICATION

The present application is a national phase entry under 35 U.S.C. §371 of International Application No. PCT/JP2010/064672 filed Aug. 30, 2010, published on Mar. 10, 2011 as WO 2011/027726 A1, which claims priority from Japanese Patent Application No. JP 2009-204892 filed in the Japanese Patent Office on Sep. 4, 2009.

TECHNICAL FIELD

The present invention relates to a wireless communication apparatus and a wireless communication method, and more specifically to a wireless communication apparatus and the like included in a high-speed wireless LAN (Local Area Network) system.

BACKGROUND ART

Examples of general standards for wireless networks may include the IEEE (Institute of Electrical and Electronics Engineers) 802.11 standards.

For example, in IEEE 802.11a/g, an OFDM (Orthogonal Frequency Division Multiplexing) modulation method, which is a multi-carrier method, is adopted as a standard for wireless LANs. In the OFDM modulation method, transmission data is distributed and transmitted over a plurality of carriers having frequencies that are orthogonal. Thus, the band of each carrier is narrow, resulting in greatly increased frequency use efficiency and increased resistance to frequency-selective fading interference.

The IEEE 802.11a/g standards support modulation methods that achieve a communication speed up to 54 Mbps. However, a demand for wireless standards capable of providing higher bit rate as communication speed still exists. For example, in IEEE 802.11n, which is an extension of IEEE 802.11a/g, next generation wireless LAN standards are being developed for the development of high-speed wireless LAN technologies over 100 Mbps of effective throughput.

In IEEE 802.11n, the OFDM_MIMO method that utilizes OFDM as its primary modulation technique is used. MIMO (Multi-Input Multi-Output) communication is a technology for providing high-speed wireless communication using a plurality of spatially multiplexed spatial streams between a transmitter and a receiver each of which is provided with a plurality of antenna elements.

A transmitter distributes and sends transmission data over a plurality of streams using a plurality of antennas. A receiver spatially demultiplexes spatially multiplexed signals received by a plurality of antennas by performing signal processing using channel characteristics, and extracts a signal for each stream without crosstalk (see, for example, PTL 1). The MIMO communication method can increase the transmission capacity in accordance with the number of antennas without increasing the frequency band, and can improve communication speed.

Due to the increased speed of the physical layer, IEEE 802.11n offers communication up to 600 Mbps. However, this means that the instantaneous maximum data transmission value is 600 Mbps per second. In IEEE 802.11n, frame aggregation as a MAC layer function is standardized as a mechanism for improving throughput by increasing the data transmission time as well as increasing the speed of the physical layer.

In frame aggregation, a large number of packets are combined so that a large amount of data can be transmitted in a single frame transmission, and the proportion of the transmission time of data is increased to improve throughput. A-MPDU (Aggregate MAC Protocol Data Unit) illustrated in FIG. 29(*a*) and A-MSDU (Aggregate MAC Service Data Unit) illustrated in FIG. 29(*b*) are specified as types of packet aggregation.

The A-MSDU type is a type in which packets are aggregated on a per-MSDU basis, that is, portions subsequent to the MAC header of an MPDU are aggregated. The A-MPDU type is a type in which packets are aggregated on a per-MPDU basis. In an A-MPDU frame, an FCS (error-detecting code) can be added to each of the MPDUs contained therein. In an A-MPDU frame, further, the maximum value of data that can be aggregated is 64 Kbytes. In an A-MSDU frame, the over of the MAC header is lower. However, since the entire frame is a single MPDU, a single FCS (error-detecting code) is used for the entire frame and if a portion of the frame has failed, all the MSDUs are to be retransmitted. In an A-MSDU frame, further, the maximum value of data that can be aggregated is 8 Kbytes.

CITATION LIST

Patent Literature

PTL 1: Japanese Unexamined Patent Application Publication No. 2002-44051

SUMMARY OF INVENTION

Technical Problem

For example, in the wireless LAN communication system described above, a problem occurs in that if fast fading occurs, the transmission characteristics are degraded, resulting in reduced throughput. Fast fading is caused in, for example, glow or rapid-start fluorescent lamps. Fluorescent bulbs included in such fluorescent lamps discharge with a frequency of occurrence that is twice (for example, 100 Hz or 120 Hz) the frequency of an alternating current power supply and emit light. During lighting, the fluorescent bulbs serve as conductors, and incoming radio waves are reflected off the surfaces of the fluorescent bulbs. During extinction, on the other hand, incoming radio waves are transmitted through the fluorescent bulbs and are reflected off metal plates or the like above the fluorescent bulbs. Accordingly, since incoming radio waves are reflected off different surfaces during lighting and during extinction, the radio wave propagation path between the transmitter and the receiver includes propagation paths that are different during lighting and extinction of the fluorescent bulbs. Due to the occurrence of different propagation paths at intervals corresponding to the frequency that is twice the power supply frequency, changes in electric field strength and phase at a frequency that is twice the power supply frequency occur. That is, fast fading (fluorescent lamp interference) occurs.

For example, in the MIMO communication method described above, a spatially multiplexed received signal is spatially demultiplexed into stream signals using a channel matrix that is estimated (channel estimation) based on a preamble signal (training signal) contained in a PHY header that is added to the beginning of a data frame. Under conditions where the fast fading described above has occurred, the propagation path of each stream signal rapidly changes. Thus, if the transmission time of the data frame is long, the propagation path of each stream signal may change in the middle of the data frame. As a result, as described above, an error may occur during the spatial demultiplexing of each stream signal using a channel matrix obtained based on a preamble signal in the PHY header.

In an environment where fast fading has occurred, therefore, depending on the maximum length of aggregation, the frame aggregation described above may reduce throughput instead. FIG. 30 illustrates how characteristic degradation of frame aggregation is caused by fast fading. An MPDU portion that is received more apart in time from the PHY header has a larger error (channel estimation error) between the channel matrix estimated in the PHY header portion and the channel matrix to be used in each MPDU subsequent to the PHY header.

Therefore, an error is more likely to occur in an MPDU portion that is received more apart in time from the PHY header. As can be seen in the figure, the six MPDUs sequent to the PHY header have no errors, and the following four MPDUs have errors. While the A-MPDU type is used by way of example in FIG. 30, the A-MSDU type can provide basically the same results.

It is an object of the present invention to prevent or reduce the degradation in transmission characteristics caused by fast fading to optimize throughput.

Solution to Problem

A concept of the present invention provides a wireless communication apparatus including:
a data transmitter that wirelessly transmits a data frame to a communication counterpart apparatus; and
a data frame limiter that limits a maximum transmission length of the data frame transmitted by the data transmitter to a predetermined length.

In the present invention, the data transmitter wirelessly transmits a data frame to the counterpart apparatus. The maximum transmission length of the data frame is limited to a predetermined length by the data frame limiter. For example, the maximum transmission length of the data frame can also be limited by providing the number of bytes as well as providing the time itself. The maximum transmission length of the data frame can also be limited by, for example, providing the maximum number of packets combined (the maximum number of aggregations) when the data frame is formed by combining a predetermined number of packets (such as A-MPDU or A-MSDU). Therefore, the maximum transmission length of the data frame is limited to a predetermined length, thus preventing or reducing degradation in transmission characteristics caused by fast fading and achieving optimized throughput.

The operation of limiting the maximum transmission length of a data frame using the data frame limiter may be performed in accordance with, for example, a user operation. For example, when a fluorescent lamp is located between a wireless communication apparatus on the transmitter side and a wireless communication apparatus on the receiver side, a user performs setting so as to limit the maximum transmission length of a data frame by, for example, referring to a UI (User Interface) screen. This ensures that the degradation in transmission characteristics, which results from fast fading caused by the fluorescent lamp (fluorescent lamp interference), can be prevented or reduced.

Further, the operation of limiting the maximum transmission length of a data frame using the data frame limiter is performed in accordance with, for example, information about detection of fast fading. In this case, the detection of fast fading is performed using the wireless communication apparatus on the transmitter side or the wireless communication apparatus on the receiver side. When the fast fading is detected using the wireless communication apparatus on the receiver side, for example, a change request message for changing the maximum transmission length of the data frame is wirelessly transmitted from the wireless communication apparatus on the receiver side to the wireless communication apparatus on the transmitter side. For example, in an IEEE 802.11 wireless LAN, the change request message is transmitted using a management action frame, a data frame, or the like. When the wireless communication apparatus on the receiver side forms an access point (AP), the change request message can also be transmitted using, for example, a beacon frame.

For example, when fast fading is caused by a fluorescent lamp that discharges with a frequency of occurrence that is twice a frequency of an alternating current power supply, the fast fading is detected by detecting a variable light source having a frequency that is twice (for example, 100 Hz or 120 Hz) the frequency of the alternating current power supply using an optical demodulator including a photoelectric conversion element. This ensures that fast fading caused by the fluorescent lamp can be detected.

Further, for example, fast fading is detected using a measured signal-to-noise ratio (SNR), in accordance with a result of comparison between a packet error rate estimated using a relationship between a signal-to-noise ratio and a packet error rate (PER) under conditions of no fast fading and a measured packet error rate. This detection technique utilizes a phenomenon that transmission characteristics greatly change depending on whether fast fading, for example, fluorescent lamp fading, has occurred or not, whereas the mean signal-to-noise ratio does not so greatly change. For example, when the measured packet error rate is higher than the estimated packet error rate, it is determined that fast fading has occurred.

Further, for example, when the data frame transmitted by the data transmitter includes a predetermined number of packets combined, fast fading is detected based on a measured packet error rate of a packet at an individual position in the data frame. This detection technique utilizes a phenomenon that a packet located at a position nearer the end of the data frame has a higher packet error rate when fast fading, for example, fluorescent lamp fading, has occurred. For example, when a packet nearer the end of the data frame has a higher packet error rate, it is determined that fast fading has occurred. This fast fading detection technique is applicable to an A-MPDU frame but is not applicable to an A-MSDU frame in which the entirety is a single MPDU.

Further, for example, when the data frame is transmitted using the multi-carrier method, fast fading is detected based on changes in a pilot signal monitored over the entirety of a received data frame. This detection technique utilizes a phenomenon that a given signal (pilot signal) continuously transmitted via a specific subcarrier separately from data greatly changes when fast fading, for example, fluorescent lamp fading, has occurred. For example, when a pilot signal changes greatly from the beginning to the end of a received data frame, it is determined that fast fading has occurred.

Further, for example, when the data frame transmitted by the data transmitter includes a predetermined number of packets combined and when the packets include convolutional encoded data, fast fading is detected based on a path metric obtained when each packet in a received data frame is decoded using Viterbi decoding. In Viterbi decoding, which is maximum likelihood decoding for decoding convolutional codes, decoding is performed by retrieving the "most likely" sequence among candidates. A path metric is an index of "likelihood", and the smaller the value, the higher the "likelihood". If the value of the finally adopted minimum path metric is large, this means that the characteristics are poor.

This detection technique utilizes a phenomenon that a path metric adopted is lower for a packet near the end of a received data frame when fast fading, for example, fluorescent lamp fading, has occurred. For example, when a path metric adopted is lower for a packet nearer the end of a received data frame, it is determined that fast fading has occurred.

Further, for example, fast fading is detected based on a measured bit error rate (BER) of each of a plurality of blocks into which an entire received data frame is divided. The bit error rate is the number of error bits in the physical layer, and is an index that most correlatively represents the actual characteristics.

This detection technique utilizes a phenomenon that the bit error rate of a block nearer the end of the received data frame is higher when fast fading, for example, fluorescent lamp fading, has occurred. For example, when the bit error rate of a block nearer the end of a received data frame is higher, it is determined that fast fading has occurred.

Further, for example, fast fading is detected based on measured maximum throughput with respect to each maximum transmission length obtained by transmitting a test data frame (traffic) for which the maximum transmission length is sequentially increased. This detection technique utilizes a phenomenon that the maximum throughput decreases from a predetermined maximum transmission length as a peak when fast fading, for example, fluorescent lamp fading, has occurred.

For example, when the data frame transmitted by the data transmitter includes a predetermined number of packets combined, the maximum transmission length is sequentially increased by sequentially incrementing the maximum number of packets combined. For example, when the maximum throughput decreases from a predetermined maximum transmission length as a peak, it is determined that fast fading has occurred. In this case, the predetermined maximum transmission length becomes an optimum maximum transmission length.

As described above, the data frame limiter limits the maximum transmission length of the data frame transmitted by the data transmitter to a predetermined length. The predetermined length is, for example, a preset fixed value. The fixed value is set by, for example, a user. Further, for example, the predetermined length is determined based on measured maximum throughput with respect to each maximum transmission length obtained by transmitting a test data frame (traffic) for which the maximum transmission length is sequentially increased.

It is to be noted that the maximum transmission length limitation function of the data frame limiter may be set enabled or disabled in accordance with a user operation.

Advantageous Effects of Invention

According to the present invention, the maximum transmission length of a data frame is limited to a predetermined length, thus preventing or reducing degradation in transmission characteristics caused by fast fading and achieving optimized throughput.

BRIEF DESCRIPTION OF DRAWINGS

FIG. 11 includes diagrams illustrating a packet format using a management action frame, and a packet format using a data frame.

FIG. 12 includes diagrams illustrating a format of a signaling message section, and diagrams illustrating a maximum-length specifying type section and a maximum-length parameter section in the format.

FIG. 17 includes diagrams illustrating an example of a displayed UI for allowing a user to issue an instruction to limit the maximum transmission length of a transmission data frame.

DESCRIPTION OF EMBODIMENTS

Figure 1:
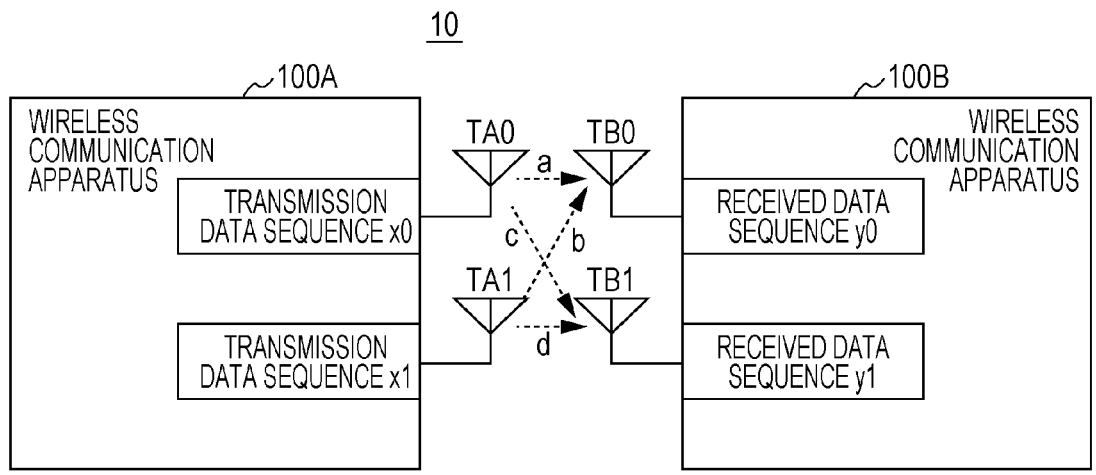
FIG. 1 is a block diagram illustrating an example configuration of a communication system according to an embodiment of the present invention.

A mode for carrying out the invention (hereinafter referred to as an "embodiment") will now be described. The description will be given in the following order:
1. Embodiment
2. Exemplary Modifications 1. Embodiment Configuration of Communication System FIG. 1 illustrates an example configuration of a communication system 10 according to an embodiment. The communication system 10 is configured such that a wireless communication apparatus 100A is connected to a wireless communication apparatus 100B via a wireless transmission path. In the communication system 10, communication is performed between the wireless communication apparatuses 100A and 100B using the OFDM_MIMO method. The communication system 10 has a 2×2 configuration in which the wireless communication apparatus 100A includes two antennas TA0 and TA1 and in which the wireless communication apparatus 100B includes two antennas TB0 and TB1.

Here, a concept of the MIMO communication system will be described using the wireless communication apparatus 100A as a transmitter and the wireless communication apparatus 100B as a receiver. The propagation path between the antennas TA0 and TB0 is referred to as a propagation path a, the propagation path between the antennas TA1 and TB0 is referred to as a propagation path b, the propagation path between the antennas TA0 and TB1 is referred to as a propagation path c, and the propagation path between the antennas TA1 and TB1 is referred to as a propagation path d.

The wireless communication apparatus 100A (transmitter) allocates a transmission data sequence x0 to the antenna TA0 and a transmission data sequence x1 to the antenna TA1. The wireless communication apparatus 100B (receiver) receives a received data sequence y0 using the antenna TB0 and a received data sequence y1 using the antenna TB1. The state of the propagation paths in this case is represented using Expression (1) below, where y denotes a received signal, H denotes a channel matrix, x denotes a transmission signal, and n denotes a noise component.

[Math. 1]

$$y = H \cdot x + n \quad (1)$$
$$y = \begin{bmatrix} y_0 \\ y_1 \end{bmatrix}, H = \begin{bmatrix} a & b \\ c & d \end{bmatrix}, x = \begin{bmatrix} x_0 \\ x_1 \end{bmatrix}, n = \begin{bmatrix} n_0 \\ n_1 \end{bmatrix}$$

While in the communication system 10 illustrated in FIG. 1, each of the transmitter and the receiver is provided with two antennas, an MIMO communication system can be established in a manner similar to that described above as long as two or more antennas are provided. The transmitter applies space-time codes to a plurality of pieces of transmission data to perform multiplexing, and distributes and transmits the multiplexed data over M transmission antennas to MIMO channels. On the other hand, the receiver spatially/temporally decodes the received signals, which have been received using N receiver antennas via the MIMO channels, and can obtain received data. Ideally, a number of MIMO streams equal to the smaller number (MIN[M, N]) of antennas among the transmitter and receiver antennas are produced.

The wireless communication apparatus 100B (receiver) needs to obtain a channel matrix H to spatially demultiplex a spatially multiplexed received signal y into stream signals x. Further, the wireless communication apparatus 100B (receiver) needs to spatially demultiplex a spatially multiplexed received signal into a plurality of streams using a predetermined algorithm on the basis of the channel matrix H.

The channel matrix H represented using Expression (1) above is generally a matrix of propagation paths, the number of which corresponds to the number of combinations of transmitter and receiver antennas by transmitting and receiving given sequences on the transmitter and receiver sides. When the number of antennas of the transmitter is N and the number of antennas of the receiver is M, an M×N matrix is obtained as a channel matrix. Therefore, M×N given sequences, or training signals, are transmitted from the transmitter, and the receiver can obtain the channel matrix H using the training signals.

However, if training signals having a plurality of streams are transmitted simultaneously without any action being taken, the receiver cannot determine from which antenna each of the training signals has been transmitted. Therefore, a time-sharing method is used in which the transmitter time-divisionally transmits a training signal from each transmitter antenna and in which the receiver obtains the channel matrix H on the basis of the training signal received using each receiver antenna. The transmitter OFDM-modulates training sequences and time-divisionally transmits the modulated sequences in units of transmission branches. Further, the receiver obtains a channel matrix for each subcarrier.

[Example Configuration of Wireless Communication Apparatus]

Figure 2:
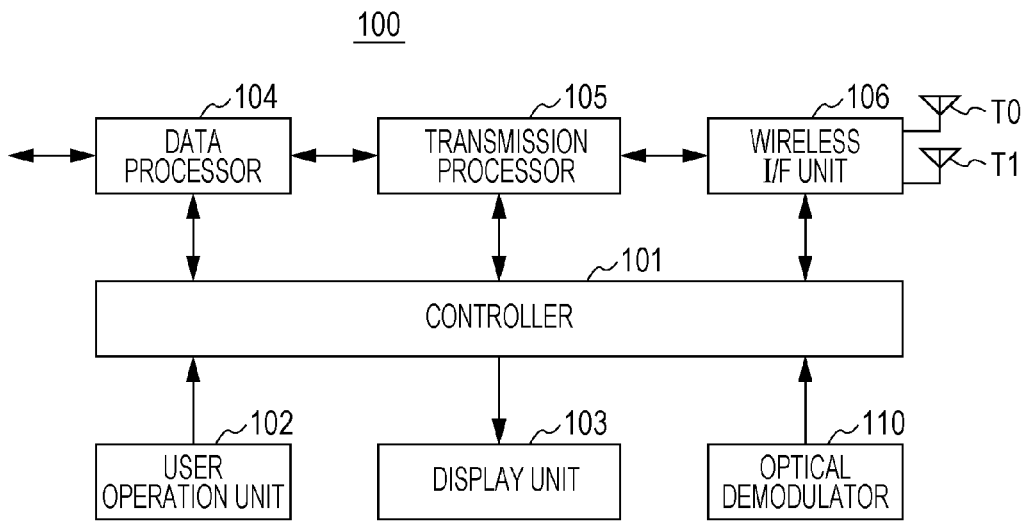
FIG. 2 is a diagram illustrating an example configuration of a wireless communication apparatus that employs the OFDM_MIMO method.

FIG. 2 illustrates an example configuration of a wireless communication apparatus 100 (100A, 100B) that employs the OFDM_MIMO method. The wireless communication apparatus 100 has a frame aggregation function serving as a MAC layer function. The wireless communication apparatus 100 includes a controller 101, a user operation unit 102, a display unit 103, a data processor 104, a transmission processor 105, a wireless interface unit 106, antennas T0 and T1, and an optical demodulator 110.

The controller 101 includes a CPU (Central Processing Unit). The controller 101 controls the various operations of the wireless communication apparatus 100, such as the receiving operation and the transmitting operation, and further performs other operations such as generating and analyzing management frames. The user operation unit 102 includes keys, buttons, and the like arranged on a housing (not illustrated) of the wireless communication apparatus 100. The display unit 103 forms a user interface (UI), and displays, for example, a UI screen based on a display signal generated from the controller 101. The display unit 103 is configured using a display panel such as an LCD (Liquid Crystal Display) or an organic EL (Electroluminescence) panel.

During transmission, in response to a request from the upper layer, the data processor 104 creates various data frames and data packets, and supplies the data frames and data packets to the transmission processor 105. Further, during reception, the data processor 104 processes and analyzes various data frames and data packets supplied from the transmission processor 105.

During transmission, the transmission processor 105 performs processing, such as adding various data headers or error-detecting codes such as FCSs (Frame Check Sequences), on the packets generated by the data processor 104, and supplies the processed data to the wireless interface unit 106. Further, during reception, the transmission processor 105 analyzes the headers added to various data frames supplied from the wireless interface unit 106. Then, the transmission processor 105 supplies the various data frames to the data processor 104 when no errors in the data frames are confirmed based on the error-detecting codes.

During transmission, the wireless interface unit 106 generates a modulated signal in a carrier frequency band from data received from the transmission processor 105, and transmits the signal from the antennas T0 and T1 as wireless signals. Further, during reception, the wireless interface unit 106 down-converts wireless signals received using the antennas T0 and T1, and converts the signals into bit sequences, thereby decoding various data frames.

The optical demodulator 110 detects a variable light source whose frequency is twice the frequency of an alternating current power supply using a photoelectric conversion element, for example, a photodiode. Specifically, the variable light source is a glow or rapid-start fluorescent lamp. As described above, the above fluorescent lamps discharge with a frequency of occurrence that is twice the frequency of an alternating current power supply (for example, 100 Hz or 120 Hz) and emit light. Changes in electric field strength at a speed that is twice the frequency of the alternating current power supply occur. That is, fast fading (fluorescent lamp interference) occurs.

The operation of the wireless communication apparatus 100 illustrated in FIG. 2 will now be described. The operation during transmission will be described. In the data processor 104, in accordance with a request from the upper layer, various data frames and data packets are created and supplied to the transmission processor 105. In the transmission processor 105, processing such as adding various data headers or error-detecting codes such as FCSs is performed on the packets generated by the data processor 104, and the processed data is supplied to the wireless interface unit 106. In the wireless interface unit 106, a modulated signal in a carrier frequency band is generated from the data received from the transmission processor 105. Then, the modulated signal is transmitted from the antennas T0 and T1 as wireless signals.

The operation during reception will be described. In the wireless interface unit 106, wireless signals received using the antennas T0 and T1 are down-converted and are converted into bit sequences, and therefore various data frames are decoded. In the transmission processor 105, the headers added to various data frames supplied from the wireless interface unit 106 are analyzed. Then, when no errors in the data frames are confirmed based on the error-detecting codes, the various data frames are supplied to the data processor 104. In the data processor 104, the various data frames and data packets supplied from the transmission processor 105 are processed and analyzed.

Further, in the optical demodulator 110, a variable light source (glow or rapid-start fluorescent lamp) whose frequency is twice the frequency of an alternating current power supply is detected. A detection signal obtained by the optical demodulator 110 is supplied to the controller 101 as a fast fading detection signal. When the subject apparatus is the transmitter, the controller 101 limits the maximum transmission length of a data frame to a predetermined length. When the subject apparatus is the receiver, the controller 101 transmits a frame length change request message to the transmitter. In this case, the transmitter limits, in response to the received frame length change request message, the maximum transmission length of the data frame to a predetermined length. The details of the process for limiting the maximum transmission length of a data frame will be described below.

[Overview of Configuration of Transmitter System (Relating to the Physical Layer)]

Figure 3:
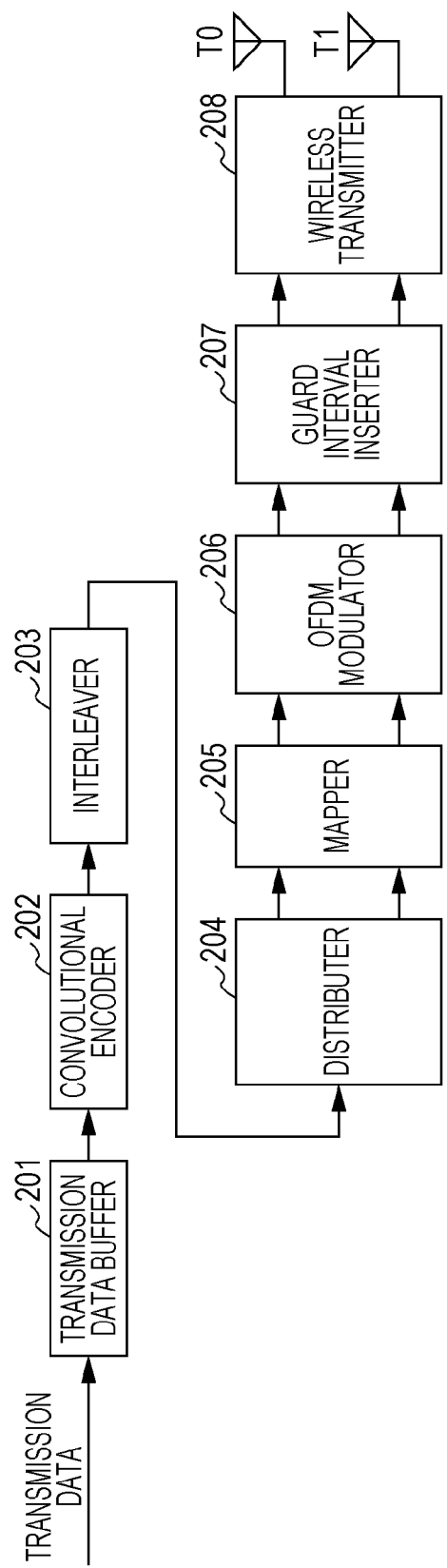
FIG. 3 is a block diagram illustrating an overview of a transmitter system (relating to the physical layer) in the wireless communication apparatus.

FIG. 3 illustrates an overview of a transmitter system (relating to the physical layer) in the wireless communication apparatus 100 illustrated in FIG. 2. The transmitter system includes a transmission data buffer 201, a convolutional encoder 202, an interleaver 203, a distributer 204, a mapper 205, an OFDM modulator 206, a guard interval inserter 207, a wireless transmitter 208, and antennas T0 and T1.

The transmission data buffer 201 temporarily accumulates transmission data. The convolutional encoder 202 convolutionally encodes the transmission data. The interleaver 203 interleaves the encoded transmission data. The distributer 204 distributes the interleaved encoded data into data streams of transmitter sequences each corresponding to one of the antennas T0 and T1.

The mapper 205 obtains a complex baseband signal, using a modulation method such as BPSK, QPSK, 16 QAM, or 64 QAM, by mapping the bit sequence of the data stream of each transmission sequence to the IQ signal space. The OFDM modulator 206 performs serial/parallel conversion on a complex baseband signal in each transmission sequence at every symbol period, assigns a resulting signal to each subcarrier, and modulates the amplitude and phase of each subcarrier. Further, the OFDM modulator 206 performs an inverse fast Fourier transform (IFFT) on each subcarrier whose amplitude and phase have been modulated, and converts the subcarriers on the frequency axis into signals on the time axis with orthogonality thereof maintained.

Figure 4:
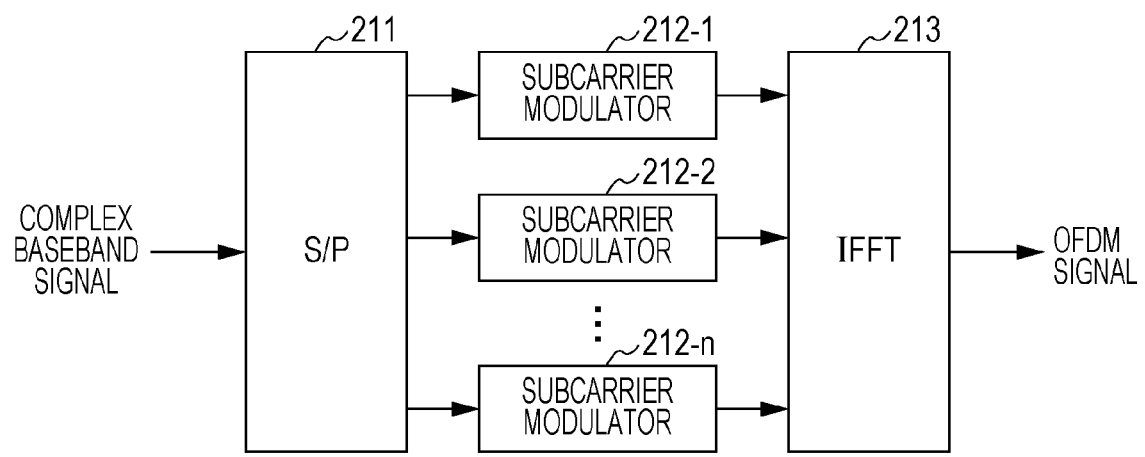
FIG. 4 is a block diagram illustrating an example configuration of an OFDM modulator corresponding to one transmission sequence.

FIG. 4 illustrates an example configuration of an OFDM signal modulator corresponding to one transmission sequence. The OFDM signal modulator includes a serial/parallel converter 211, a plurality of subcarrier modulators 212-1 to 212-n, and an inverse fast Fourier transform (IFFT) unit 213.

Referring back to FIG. 3, the guard interval inserter 207 inserts a guard interval into an OFDM signal in each transmission sequence in order to eliminate the multipath effect. The wireless transmitter 208 performs processing on an OFDM signal in each transmission sequence, such as band limiting based on digital filtering, conversion from a digital signal to an analog signal, and frequency conversion for up-conversion to a desired frequency band, and then transmits the resulting signal from the antennas T0 and T1.

The operation of the transmitter system will be briefly described. Transmission data from the upper layer is temporarily accumulated in the transmission data buffer 201, and is then supplied to the convolutional encoder 202. In the convolutional encoder 202, the transmission data is convolutionally encoded, and encoded transmission data is obtained. The encoded transmission data is supplied to the interleaver 203. In the interleaver 203, the encoded transmission data is interleaved.

The interleaved encoded data is distributed into data streams of two transmission sequences corresponding to the antennas T0 and T1 using the distributer 204, which are then supplied to the mapper 205. In the mapper 205, the bit sequences of the data streams are mapped in the IQ signal space for each transmission sequence in accordance with the modulation method, and complex baseband signals are obtained. The complex baseband signals of the individual transmission sequences are supplied to the OFDM modulator 206.

In the OFDM modulator 206, serial/parallel conversion is performed on the complex baseband signal in each of the transmission sequences at every symbol period, a resulting signal is assigned to each subcarrier, and the amplitude and phase of each subcarrier are modulated. Further, in the OFDM modulator 206, an inverse fast Fourier transform (IFFT) is performed on each subcarrier whose amplitude and phase have been modulated, and the subcarriers on the frequency axis are converted into signals on the time axis with orthogonality thereof maintained.

The OFDM signals of the transmission sequences generated by the OFDM modulator 206 are supplied to the wireless transmitter 208 after guard intervals have been inserted by the guard interval inserter 207 in order to eliminate the multipath effect. In the wireless transmitter 208, the OFDM signal of each transmission sequence is band-limited and then converted into an analog signal, and is further up-converted to a desired frequency band. The up-converted OFDM signals of the transmission sequences are transmitted from the antennas T0 and T1.

[Overview of Receiver System (Relating to the Physical Layer)]

Figure 5:
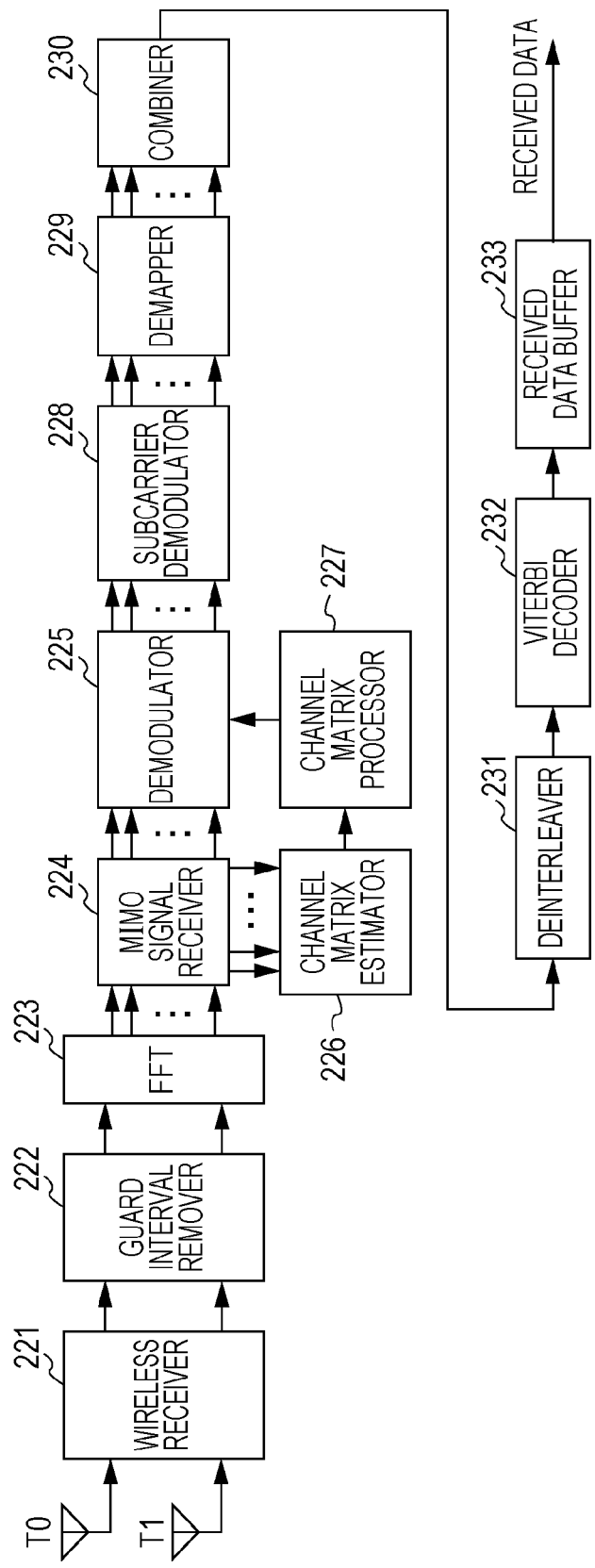
FIG. 5 is a block diagram illustrating an overview of a receiver system (relating to the physical layer) in the wireless communication apparatus.

FIG. 5 illustrates an overview of a receiver system (relating to the physical layer) in the wireless communication apparatus 100 illustrated in FIG. 2. The receiver system includes a wireless receiver 221, a guard interval remover 222, a fast Fourier transform (FFT) unit 223, a MIMO signal receiver 224, a demodulator 225, a channel matrix estimator 226, and a channel matrix processor 227. The receiver system further includes a subcarrier demodulator 228, a demapper 229, a combiner 230, a deinterleaver 231, a Viterbi decoder 232, and a received data buffer 233.

The wireless receiver 221 performs processing on each of the signals received using the antennas T0 and T1, such as frequency conversion for down-conversion, conversion from an analog signal to a digital signal, and band limiting based on digital filtering, to obtain a data stream of each received sequence. The guard interval remover 222 removes the guard interval from the data stream of each received sequence. The fast Fourier transform unit 223 applies an FFT operation to the data streams from which the guard intervals have been removed in units of transmission symbols for each received sequence while performing synchronization of transmission symbols, converts the signals on the time axis into the signals on the frequency axis, and reproduces signals corresponding to the subcarriers.

The MIMO signal receiver 224 separates the signals corresponding to the subcarriers into data and training symbols (training signals) for each received sequence, and outputs the data to the demodulator 225 and the training symbols to the channel matrix estimator 226. The channel matrix estimator 226 performs processing such as correlating given sequences with the training symbols to estimate the elements of the channel matrix H (see Expression (1)).

When the ZF (Zero Forcing: interference cancellation) method is used, the channel matrix processor 227 calculates an inverse matrix or a pseudo-inverse matrix of the channel matrix (transfer function matrix) H for each subcarrier. Further, when the MMSE (Minimum Mean Square Error) method is used, the channel matrix processor 227 calculates an inverse matrix or a pseudo-inverse matrix of a matrix obtained by adding the mean power of noise to the channel matrix H for each subcarrier.

The demodulator 225 demodulates a received signal vector for each subcarrier using the inverse matrix or pseudo-inverse matrix calculated by the channel matrix processor 227. The subcarrier demodulator 228 demodulates each modulated subcarrier in each of the transmitted streams obtained by the demodulator 225, and obtains complex baseband signals in the IQ signal space. The demapper 229 demaps the complex baseband signals in the IQ signal space, and obtains a bit sequence for each of the transmitted streams and for each subcarrier.

The combiner 230 combines the bit sequences and reconfigures a single bit sequence. The deinterleaver 231 deinterleaves the bit sequence obtained by the combiner 230. The combiner 230 and the deinterleaver 231 correspond to the distributer 204 and the interleaver 203 in the transmitter system illustrated in FIG. 3, respectively. In addition, the Viterbi decoder 232 performs Viterbi decoding as maximum likelihood decoding on the convolutional encoded bit sequence, and obtains error-corrected received data. The received data buffer 233 temporarily accumulates the received data obtained by the Viterbi decoder 232.

The operation of the receiver system will be briefly described. Signals received using the antennas T0 and T1 are supplied to the wireless receiver 221. In the wireless receiver 221, the signals received using the antennas T0 and T1 are subjected to down-conversion, and are further subjected to conversion into digital signals and band limiting. The data streams of the received sequences obtained by the wireless receiver 221 are supplied to the guard interval remover 222 where the guard intervals are removed, and are then supplied to the fast Fourier transform unit 223. In the fast Fourier transform unit 223, for each received sequence, an FFT operation is applied to the data stream from which the guard interval has been removed for each transmission symbol, the signals on the time axis are converted into the signals on the frequency axis, and the signals corresponding to the subcarriers are reproduced.

The signals corresponding to the subcarriers for each received sequence, which have been obtained by the fast Fourier transform unit 223, are supplied to the MIMO signal receiver 224. The MIMO signal receiver 224 separates the signals corresponding to the subcarriers into data and training symbols for the individual received sequences, and outputs the data to the demodulator 225 and the training symbols to the channel matrix estimator 226.

In the channel matrix estimator 226, processing such as determining correlation between given sequences and the training symbols is performed, and the elements of the channel matrix H are estimated. The elements of the channel matrix estimated in this manner are supplied to the channel matrix processor 227. In the channel matrix processor 227, based on the elements of the channel matrix H, an inverse matrix or a pseudo-inverse matrix of the channel matrix (ZF method), or an inverse matrix or a pseudo-inverse matrix of a matrix obtained by adding the mean power of noise to the channel matrix H (MMSE method) is calculated.

The inverse matrix or pseudo-inverse matrix for each subcarrier, which has been calculated by the channel matrix processor 227, is supplied to the demodulator 225. In the demodulator 225, for each subcarrier, a received signal vector is demodulated using the inverse matrix or pseudo-inverse matrix calculated by the channel matrix processor 227. Individual modulated subcarriers in each of the transmission streams, which are obtained by the demodulator 225, are supplied to the subcarrier demodulator 228.

In the subcarrier demodulator 228, individual modulated subcarriers for each stream are demodulated, and complex baseband signals in the IQ signal space are obtained. In the demapper 229, the complex baseband signals are demapped, and a bit sequence for each of the transmitted streams and for each subcarrier is obtained. The bit sequences are combined by the combiner 230 and a single bit sequence is reconfigured.

The bit sequence obtained by the combiner 230 is deinterleaved by the deinterleaver 231, and is then supplied to the Viterbi decoder 232. The bit sequence supplied to the Viterbi decoder 232 is a convolutional encoded bit sequence. In the Viterbi decoder 232, Viterbi decoding is performed on the convolutional encoded bit sequence, and error-corrected received data is obtained. The error-corrected received data is temporarily accumulated in the received data buffer 233, and is then supplied to the upper layer.

[Process for Limiting Maximum Transmission Length of Data Frame]

Figure 6:
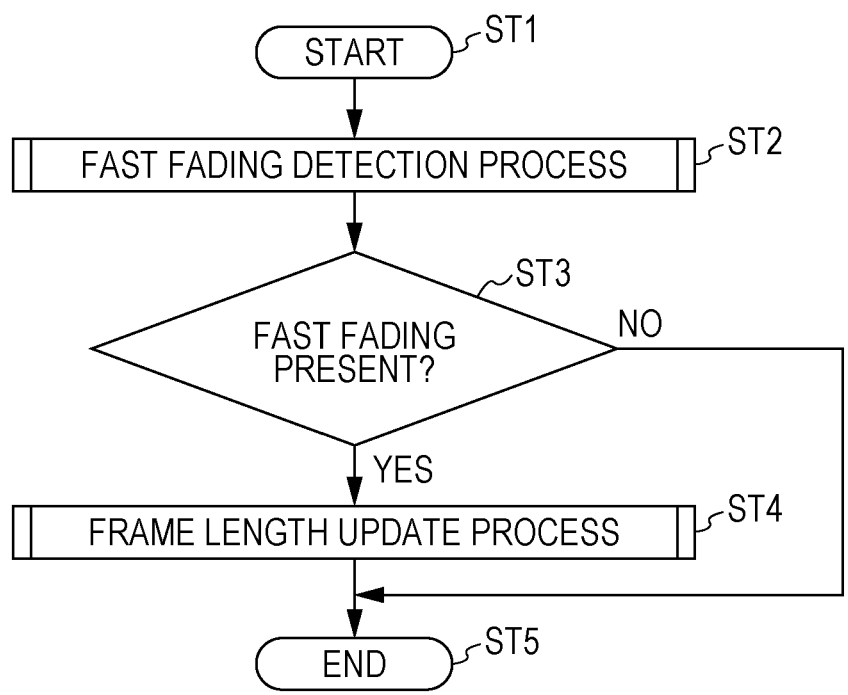
FIG. 6 is a flowchart illustrating a procedure of a process for limiting the maximum transmission length of a data frame, which is performed by a controller in the wireless communication apparatus.

FIG. 6 is a flowchart illustrating a procedure of a process for limiting the maximum transmission length of a data frame, which is performed by the controller 101 in the wireless communication apparatus 100 illustrated in FIG. 2. For example, the controller 101 executes the process only once when the wireless communication apparatus 100 is started, or executes the process periodically. Alternatively, the controller 101 executes the process in response to a trigger such as a user operation.

In step ST1, the controller 101 starts the process, and then proceeds to the processing of step ST2. In step ST2, the controller 101 performs a fast fading (fluorescent lamp interference) detection process. In this case, the controller 101 causes the optical demodulator 110 to perform a process for detecting a variable light source whose frequency is twice the frequency of an alternating current power supply.

Then, in step ST3, the controller 101 determines whether or not fast fading is present. When the optical demodulator 110 detects a variable light source whose frequency is twice the frequency of an alternating current power supply, the controller 101 determines that fast fading is present. When it is determined that fast fading is present, in step ST4, the controller 101 performs a frame length update process. Then, in step ST5, the controller 101 ends the process. On the other hand, when it is determined that fast fading is not present, the controller 101 immediately proceeds to step ST5, and ends the process.

Next, the details of the frame length update process in step ST4 will further be described. The controller 101 performs different processes in the case of "subject transmission" in which the subject apparatus is the transmitter of a data frame and the case of "subject reception" in which the subject apparatus is the receiver of a data frame.

Figure 7:
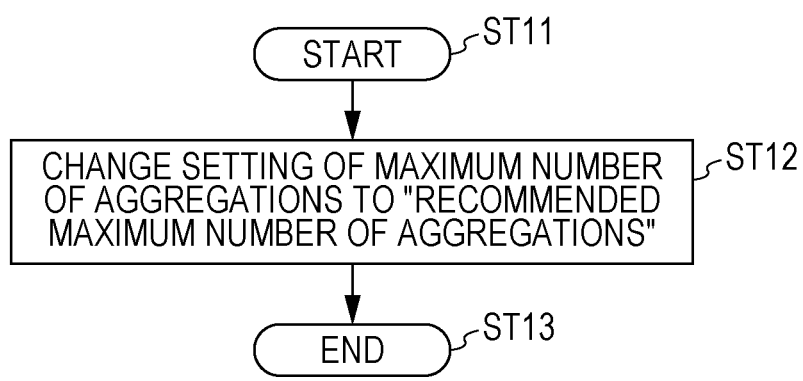
FIG. 7 is a flowchart illustrating a procedure of a frame length update process of a subject apparatus in the case of "subject transmission".

FIG. 7 is a flowchart illustrating a procedure of a frame length update process performed in the case of "subject transmission". In step ST11, the controller 101 starts the frame length update process. Then, in step ST12, the controller 101 changes the setting of the maximum number of aggregations (the maximum number of packets combined) in frame aggregation (A-MPDU, A-MSDU) to "the recommended maximum number of aggregations". After the processing of step ST12, in step ST13, the controller 101 ends the frame length update process.

Here, the controller 101 holds "the recommended maximum number of aggregations" as, for example, a fixed value. In step ST12, the controller 101 uses the held "recommended maximum number of aggregations". "The recommended maximum number of aggregations" can be obtained from, for example, the correspondence between the maximum number of aggregations (Aggregate MAX packet num) and the UDP payload throughput (UDPPayload Throughput) which is determined experimentally.

Figure 8:
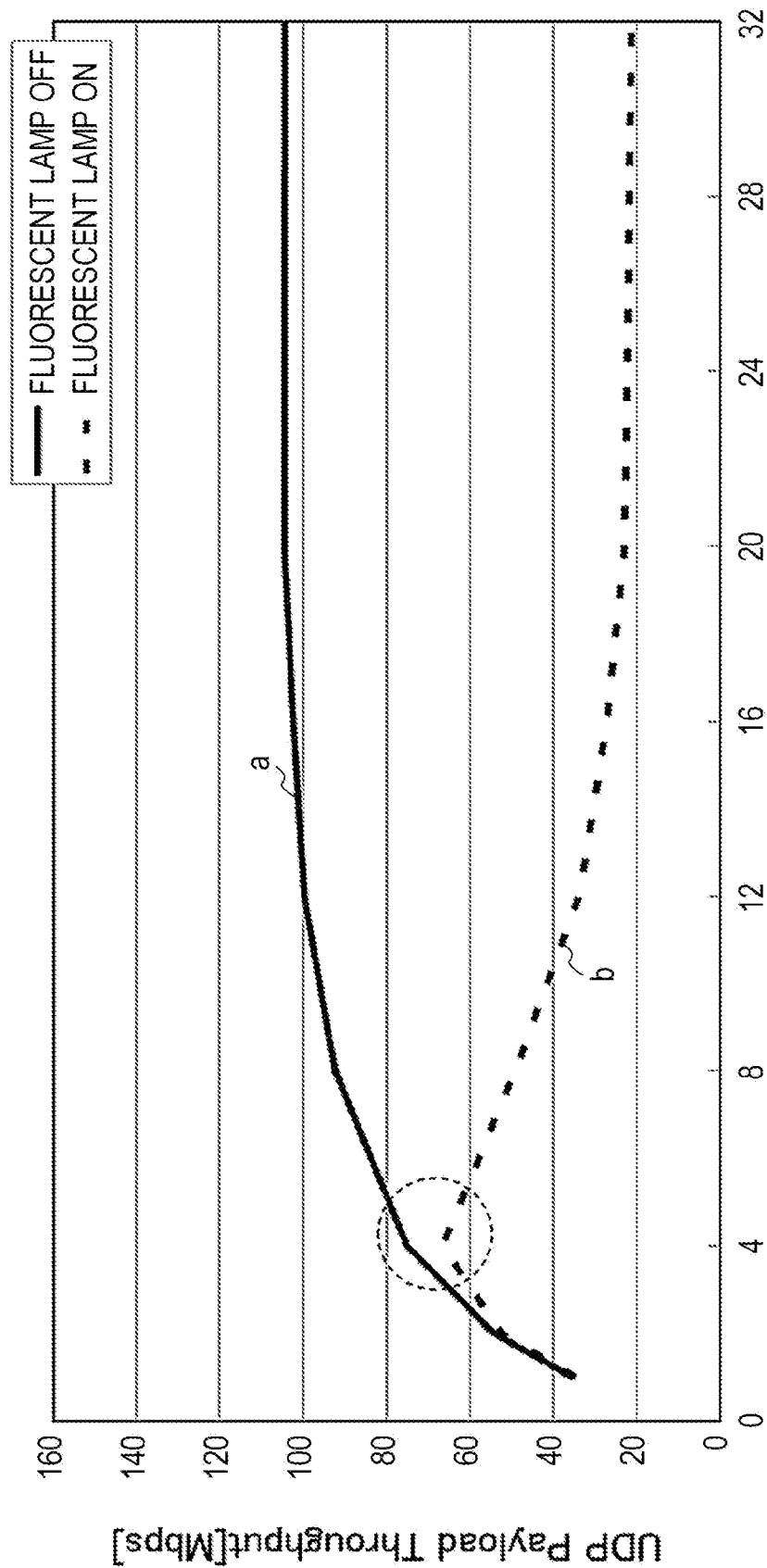
FIG. 8 is a diagram illustrating an example of the correspondence between the maximum number of aggregations and UDP payload throughput, which is determined experimentally.

FIG. 8 illustrates an example of the correspondence between the maximum number of aggregations and the UDP payload throughput, which is determined experimentally. In the illustrated example, 8 channels (2.447 GHz) are used, and two-stream transmission including two-antenna transmission and two-antenna reception in the 20-MHz mode is performed with a PHY rate of 130 Mbps at the IP Layer, 1500 bytes, by way of example. Solid line a represents the correspondence when a fluorescent lamp activated by a 50 Hz power supply is in an off state (OFF). Further, broken line b represents the correspondence when the above fluorescent lamp is in an on state (ON) and when fast fading (fluorescent lamp interference) has occurred.

As can be seen from the correspondence represented by the broken line b, in a fast-fading environment with a fluorescent lamp activated by a 50 Hz power supply with a PHY rate of 130 Mbps, the highest efficiency is obtained when four packets in the IP Layer, 1500 bytes, are aggregated. "The recommended maximum number of aggregations" in this environment is therefore set to, for example, "4".

Figure 9:
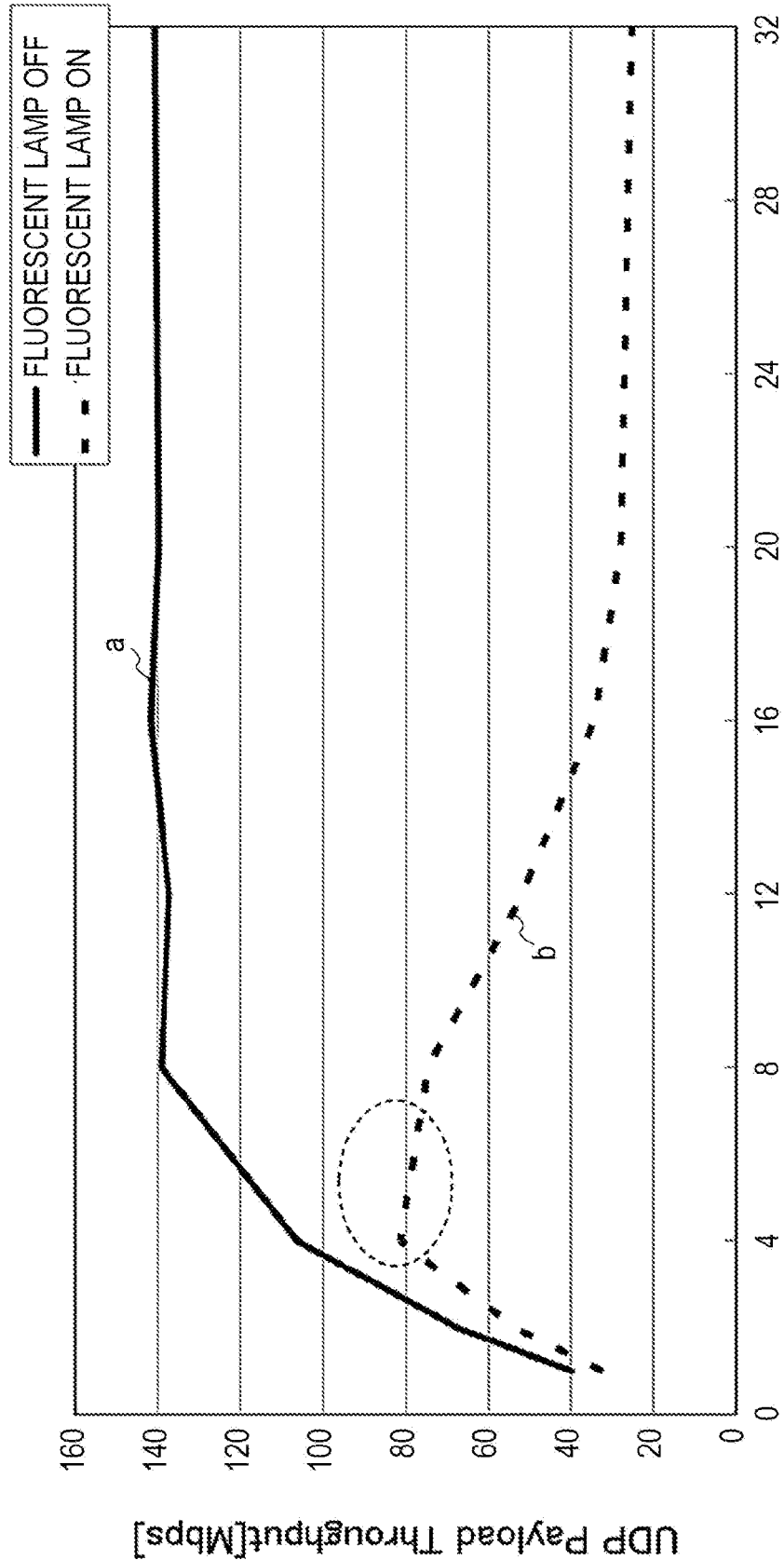
FIG. 9 is a diagram illustrating another example of the correspondence between the maximum number of aggregations and UDP payload throughput, which is determined experimentally.

FIG. 9 illustrates another example of the correspondence between the maximum number of aggregations and the UDP payload throughput, which is determined experimentally. In the illustrated example, 44 channels (5.22 GHz) are used, and two-stream transmission including two-antenna transmission and two-antenna reception in the 40-MHz mode is performed with a PHY rate of 300 Mbps at the IP Layer, 1500 bytes, by way of example. Solid line a represents the correspondence when a fluorescent lamp activated by a 50 Hz power supply is in an off state (OFF). Further, broken line b represents the correspondence when the above fluorescent lamp is in an on state (ON) and when fast fading (fluorescent lamp interference) has occurred.

As can be seen from the correspondence represented by the broken line b, in a fast-fading environment with a fluorescent lamp activated by a 50 Hz power supply with a PHY rate of 300 Mbps, the highest efficiency is obtained when four to seven packets in the IP Layer, 1500 bytes, are aggregated. "The recommended maximum number of aggregations" in this environment is therefore set to, for example, "7".

While the type of aggregation used in the examples illustrated in FIGS. 8 and 9 is A-MPDU, A-MSDU may also be used. In this case, similarly, the correspondence between the maximum number of aggregations and the UDP payload throughput can be determined experimentally, and "the recommended maximum number of aggregations" can be obtained from the determined correspondence.

In the above description, the correspondence between the maximum number of aggregations and the UDP payload throughput is determined experimentally, and "the recommended maximum number of aggregations", that is, the optimum number of packets that are allowed to be aggregated, can be obtained from the determined correspondence. However, the optimum number of packets can also be determined from the theoretical equations below.

Here, the optimum time [s] from the timing of channel estimation (timing of the PHY header) to the completion of transmission of packets that use the result of the estimation is represented by X, the optimum maximum length [byte] that allows aggregation is represented by Y, and the optimum number of packets [pieces] that allows aggregation is represented by Z. Further, the power supply frequency [Hz] is represented by M, the maximum size [byte] of L3 (IP Layer) is represented by N, the PHY rate [Mbps] is represented by R, the presence/absence of AES encryption (1: presence/0: absence) is represented by A, and the number of MAC addresses (3: normal/4: WDS mode etc.) is represented by B.

As is observed experimentally, in a fast-fading environment with a fluorescent lamp activated by a 50 Hz power supply, the performance is optimized when the time taken from the timing of channel estimation to the completion of transmission of packets that use the result of the estimation is about 300 us. Therefore, X, Y, and Z can be determined from, for example, theoretical equations (2), (3), and (4) as follows:

$$X=0.8\times(300E-06\times50/M) \text{ to } 1.2\times(300E-06\times50/M) \quad (2)$$

$$Y=X\times R\times 1E06/8 \quad (3)$$

$$Z=\text{INT}(Y/(6\times B+N+A\times 8+20))+1 \quad (4)$$

Figure 10:
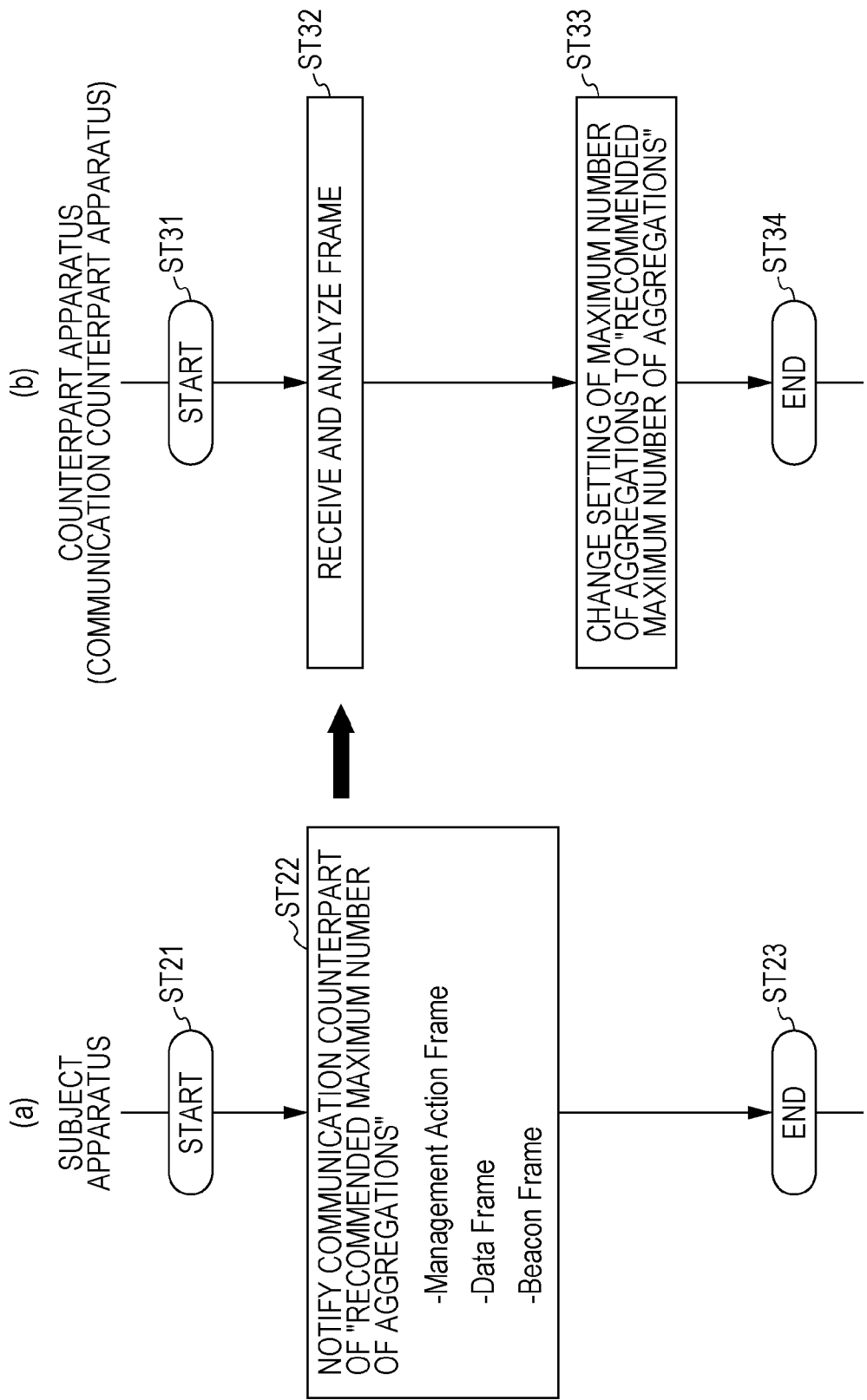
FIG. 10 includes a flowchart illustrating a procedure of a frame length update process of the subject apparatus in the case of "subject reception", and a flowchart illustrating a procedure of a process of the counterpart apparatus (communication counterpart apparatus) that is notified of "the recommended maximum number of aggregations".

FIG. 10(a) is a flowchart illustrating a procedure of a frame length update process performed in the case of "subject reception". In step ST21, the controller 101 starts the frame length update process. Then, in step ST22, the controller 101 notifies the counterpart apparatus (communication counterpart apparatus) of "the recommended maximum number of aggregations" in frame aggregation (A-MPDU, A-MSDU). After the processing of step ST22, in step ST23, the controller 101 ends the frame length update process.

Here, as in the case of "subject transmission" described above, the controller 101 holds "the recommended maximum number of aggregations" as, for example, a fixed value. In step ST22, the controller 101 uses the held "recommended maximum number of aggregations". Further, the controller 101 performs the notification of "the recommended maximum number of aggregations" using a management action frame, a data frame, a beacon frame, or the like. The beacon frame can be used only when the subject apparatus forms an access point (AP).

FIG. 11(a) illustrates an example of a packet format using a management action frame. A packet includes a MAC header section, an action category section, an action detail section, and a signaling message section. The MAC header section has frame type "management action". The action category section has category "public action". The action detail section has action "Max length change request". The signaling message section is assigned a frame length change request message.

FIG. 11(b) illustrates an example of a packet format using a data frame. A packet includes a MAC header section, an LLCSNAP header section, an Ether type section, and a signaling message section. The MAC header section has frame type "data". The LLC SNAP header section has a fixed 6-byte pattern. The Ether type section has Ether type "Max length change request". The signaling message section is assigned a frame length change request message.

FIG. 12(a) illustrates an example of a format of the signaling message section. The signaling message section includes a maximum-length specifying type section and a maximum-length parameter section.

As described above, the maximum transmission length of a data frame may be specified using, as well as the maximum number of aggregations, the following methods: the total number of bytes, the total transmission time, TXOP (TransmissionOpportunity) limit, etc., by way of example.

As illustrated in FIG. 12(b), the maximum-length specifying type section contains information indicating a maximum-length specifying type. For example, "00" indicates the specification with the total number of bytes, "01" indicates the specification with the total number of aggregations combined, "02" indicates the specification with the total transmission time, and "03" indicates TXOP limit. Further, as illustrated in FIG. 12(c), the maximum-length parameter section contains maximum values of individual specified types. In this case, the unit may be changed depending on the specified type.

Although an example of a packet format using a beacon frame is not illustrated, a packet includes a signaling message section that is assigned a frame length change request message.

When a beacon frame is used, the maximum length of aggregation from the counterpart can also be limited using an existing parameter specified in 802.11n without adding a new signaling message such as the "Max length change request" signaling message described above. Specifically, in the "A-MPDU Parametersfield" included in the "HT Capabilities element", the "Maximum A-MPDU Length Exponent" indicates the maximum length of A-MPDU receivable by the subject apparatus, which can be changed to limit the maximum length of A-MPDU from the counterpart. Further, the "Maximum A-MSDUlength" in the "HT Capabilities element" indicates the maximum length of A-MSDU permitted in communication with the subject apparatus. This parameter can be used for the limitation of A-MSDU.

FIG. 10(b) is a flowchart illustrating a procedure of the process of the controller 101 of the counterpart apparatus (communication counterpart apparatus) that is notified of "the recommended maximum number of aggregations" in the frame length update process in the case of "subject reception".

In step ST31, the controller 101 starts the process, and then proceeds to the processing of step ST32. In step ST32, the controller 101 receives and interprets a frame (such as a management action frame, a data frame, or a beacon frame) indicating "the recommended maximum number of aggregations".

Then, in step ST33, the controller 101 changes the setting of the maximum number of aggregations (the maximum number of packets combined) in frame aggregation (A-MPDU, A-MSDU) to "the recommended maximum number of aggregations". After the processing of step ST33, in step ST34, the controller 101 ends the process.

Figure 13:
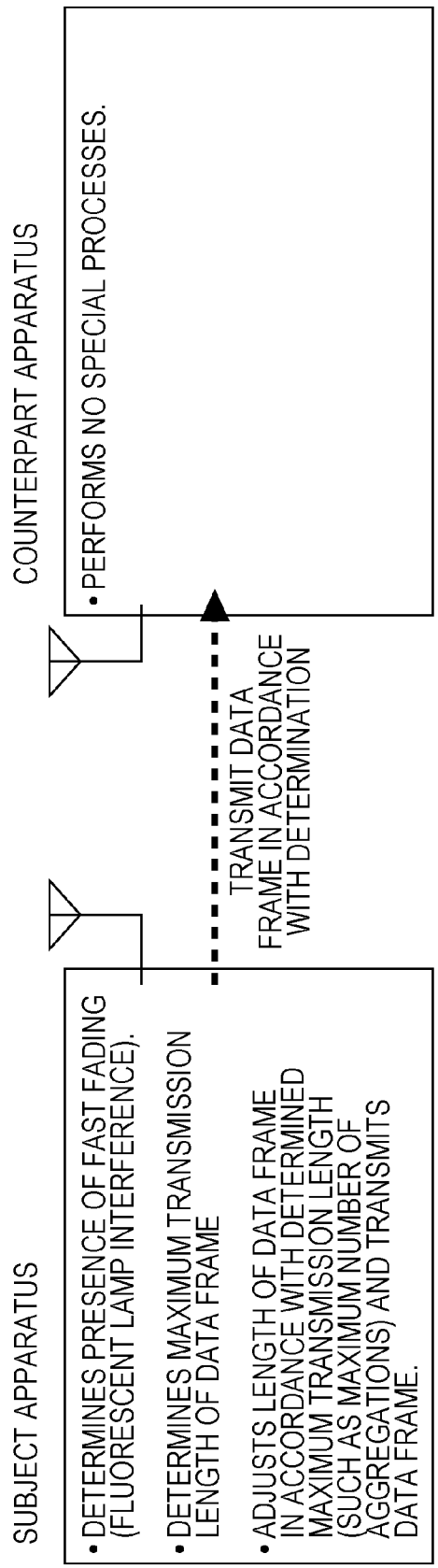
FIG. 13 is a diagram illustrating an overview of processes of the subject apparatus and the counterpart apparatus (communication counterpart apparatus) in the case of "subject transmission".

Here, the definitions of "subject transmission" and "subject reception" described above will further be described. FIG. 13 illustrates an overview of processes of the subject apparatus and the counterpart apparatus (communication counterpart apparatus) in the case of "subject transmission". The subject apparatus determines the presence of fast fading (fluorescent lamp interference). If fast fading is present, the subject apparatus determines "the recommended maximum number of aggregations" as the maximum transmission length of a data frame. Then, the subject apparatus adjusts the length of the data frame, for example, the number of aggregations, in accordance with the determined maximum transmission length, and transmits the data frame. In the case of subject transmission, the counterpart apparatus performs no special processes.

Figure 14:
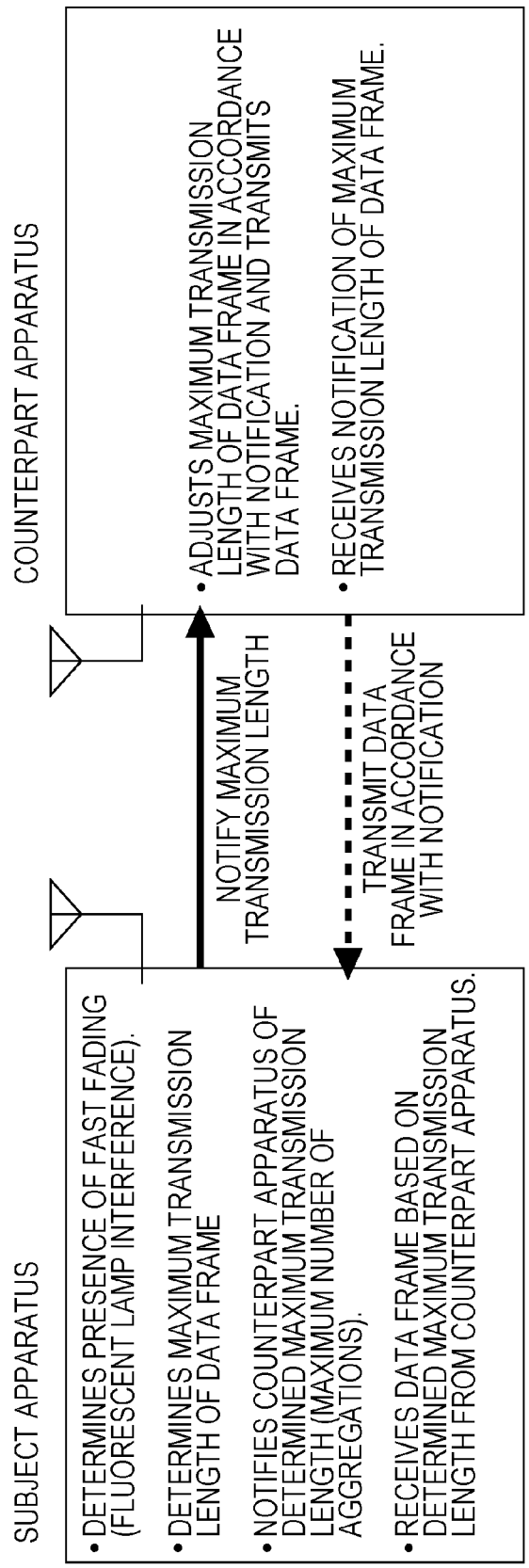
FIG. 14 is a diagram illustrating an overview of processes of the subject apparatus and the counterpart apparatus (communication counterpart apparatus) in the case of "subject reception".

FIG. 14 illustrates an overview of processes of the subject apparatus and the counterpart apparatus (communication counterpart apparatus) in the case of "subject reception". The subject apparatus determines the presence of fast fading (fluorescent lamp interference). If fast fading is present, the subject apparatus determines "the recommended maximum number of aggregations" as the maximum transmission length of a data frame. Then, the subject apparatus notifies the counterpart apparatus of the determined maximum transmission length (the maximum number of aggregations).

The counterpart apparatus receives a notification of the maximum transmission length of the data frame from the subject apparatus. Then, the counterpart apparatus adjusts the length of the data frame, for example, the number of aggregations, in accordance with the notification, and transmits the data frame to the subject apparatus. The subject apparatus receives the length-adjusted data frame that has been transmitted from the counterpart apparatus.

In the above description, the fixed value held in the controller 101 is used as "the recommended maximum number of aggregations" that is used by the subject apparatus or used as "the recommended maximum number of aggregations" of which the counterpart apparatus is notified. However, a user may be allowed to set the maximum number of aggregations by operating the user operation unit 102.

Figure 15:
FIG. 15 is a diagram illustrating an example of a UI displayed when a user sets the maximum number of aggregations.

FIG. 15 illustrates an example of a UI (User Interface) displayed for user setting. In the illustrated example, by way of example, the UI is displayed on a display panel of, for example, a television receiver including the wireless communication apparatus 100. In the example of the displayed UI, first, "the recommended maximum number of aggregations" as a fixed value held therein is displayed, and a user can change the fixed value by increasing or decreasing the value. Instead of presenting a specific value indicating the maximum number of aggregations to a user in the manner described above, for example, abstract representation of the maximum number of aggregations, such as "large (internally, 32)/middle (internally, 16)/small (internally, 8)", may be presented to a user so that the user can select a desired one.

Furthermore, the maximum number of aggregations can be set by allowing a user to operate the user operation unit 102 and to cause the controller 101 to calculate the optimum value of the maximum number of aggregations. In this case, the controller 101 measures maximum throughput with respect to each maximum number of aggregations that is obtained by transmitting a test data frame (traffic) for which the maximum number of aggregations is sequentially increased. Then, the controller 101 determines the maximum number of aggregations that provides the highest efficiency as the optimum value on the basis of the correspondence between the maximum number of aggregations and the UDP payload throughput (see FIGS. 8 and 9).

Figure 16:
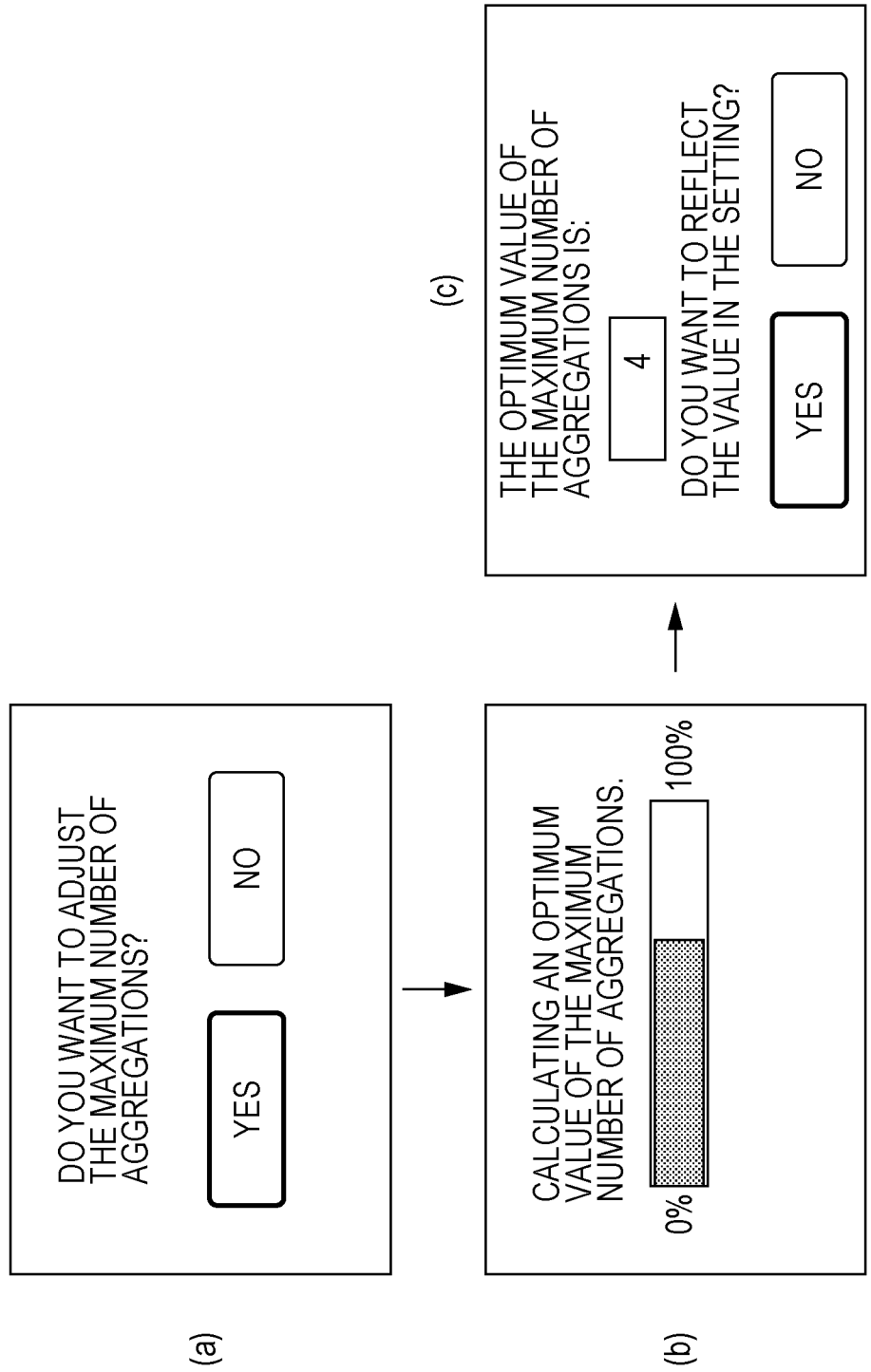
FIG. 16 includes diagrams illustrating an example of a UI displayed when a user performs the calculation of an optimum value of the maximum number of aggregations.

FIG. 16 illustrates an example of a UI displayed for user setting. In the illustrated example, by way of example, the UI is displayed on a display panel of, for example, a television receiver including the wireless communication apparatus 100. FIG. 16(a) illustrates an example of a displayed UI for allowing a user to select whether to adjust the maximum number of aggregations. FIG. 16(b) illustrates an example of a UI displayed when the controller 101 is currently calculating an optimum value of the maximum number of aggregations. FIG. 16(c) illustrates a displayed UI for, after an optimum value of the maximum number of aggregations has been determined, allowing a user to select whether to reflect the optimum value in the setting. Instead of presenting a specific value indicating an optimum value of the maximum number of aggregations to a user, the optimum value may be presented as abstract representation using characters such as "large/middle/small", marks, or the like.

As described above, in the communication system 10 illustrated in FIG. 1, the wireless communication apparatus 100 on the transmitter side of a data frame or on the receiver side of a data frame detects fast fading (fluorescent lamp interference). Then, when fast fading is detected by the wireless communication apparatus 100 on the transmitter side, the wireless communication apparatus 100 on the transmitter side limits the maximum number of aggregations of a transmission data frame (A-MPDU, A-MSDU) to "the recommended maximum number of aggregations" as, for example, a fixed value.

When fast fading is detected by the wireless communication apparatus 100 on the receiver side, the wireless communication apparatus 100 on the transmitter side is notified of "the recommended maximum number of aggregations" as, for example, a fixed value. Then, the wireless communication apparatus 100 on the transmitter side limits the maximum number of aggregations of a transmission data frame (A-MPDU, A-MSDU) to "the recommended maximum number of aggregations". Therefore, the degradation in transmission characteristics caused by fast fading (fluorescent lamp interference) can be prevented or reduced and throughput can be optimized.

2. Exemplary Modifications

In the foregoing embodiment, the communication system 10 supports the frame aggregation function, and limits the maximum number of aggregations of a data frame (A-MPDU, A-MSDU), thereby limiting the maximum transmission length of the data frame. However, the present invention can also be applied to a communication system that does not support the frame aggregation function.

Further, in the foregoing embodiment, the wireless communication apparatus 100 includes a detector (optical demodulator 110) that detects fast fading (fluorescent lamp interference), and allows automatic limitation of the maximum transmission length of the data frame upon detection of fast fading. However, another configuration may also be adopted in which a user issues an instruction by operating the user operation unit 102 to limit the maximum transmission length of the data frame.

FIG. 17(a) illustrates an example of a displayed UI for allowing a user to issue an instruction to limit the maximum transmission length of a transmission data frame. In the illustrated example, by way of example, the UI is displayed on a display panel of, for example, a television receiver (TV) including a wireless communication apparatus. In the example of the displayed UI, for example, a user is allowed to select whether a fluorescent lamp (non-inverter type) is located between an access point (AP) that is the wireless communication apparatus on the transmitter side and a television receiver including the wireless communication apparatus on the receiver side.

When the user selects "YES" on the basis of the displayed UI, the maximum transmission length of the transmission data frame is limited. In this case, a frame length change request message is transmitted from the television receiver to the access point using a management action frame, a data frame, or the like (see FIGS. 11 and 12).

FIG. 17(b) illustrates another example of a displayed UI for allowing a user to issue an instruction to limit the maximum transmission length of a transmission data frame. In the illustrated example, by way of example, the UI is displayed on a display panel of, for example, a television receiver (TV) including a wireless communication apparatus. In the example of the displayed UI, a user is allowed to select whether the function for limiting the maximum number of aggregations is made active.

Only when the user selects "YES" on the basis of the displayed UI and the function for limiting the maximum number of aggregations is made active, the maximum number of aggregations is limited to "the recommended maximum number of aggregations" upon detection of fast fading. In other words, even when fast fading is detected, the maximum number of aggregations is not limited unless the function for limiting the maximum number of aggregations is made active.

[Another Technique for Detecting Fast Fading]

Further, in the foregoing embodiment, the wireless communication apparatus 100 is provided with the optical demodulator 110, and the optical demodulator 110 detects a variable light source whose frequency is twice the frequency of an alternating current power supply. Thus, fast fading (fluorescent lamp interference) caused by a fluorescent lamp is detected. The fast fading to which the present invention can be applied is not limited to fast fading caused by fluorescent lamps. The technique for detecting fast fading using the optical demodulator 110 described above makes it feasible to detect fast fading caused by fluorescent lamps but makes it unfeasible to detect fast fading caused by other reasons. Other techniques for detecting fast fading that can be applied in the present invention will now be described.

"Detection technique A: detection based on the correspondence between the maximum transmission length and the maximum throughput"

In this detection technique, fast fading is detected based on measured maximum throughput with respect to each maximum transmission length obtained by transmitting a test data frame (traffic) for which the maximum transmission length, for example, the maximum number of aggregations, is sequentially increased. This detection technique utilizes a phenomenon that a maximum throughput decreases from a predetermined maximum transmission length as a peak when fast fading, for example, fluorescent lamp fading (fluorescent lamp interference), has occurred.

In this detection technique, it is determined that fast fading has occurred when a maximum throughput decreases from a predetermined maximum transmission length as a peak, and the predetermined maximum transmission length becomes an optimum maximum transmission length. That is, this detection technique allows the detection of fast fading as well as the determination of an optimum maximum transmission length, for example, an optimum maximum number of aggregations.

Figure 18:
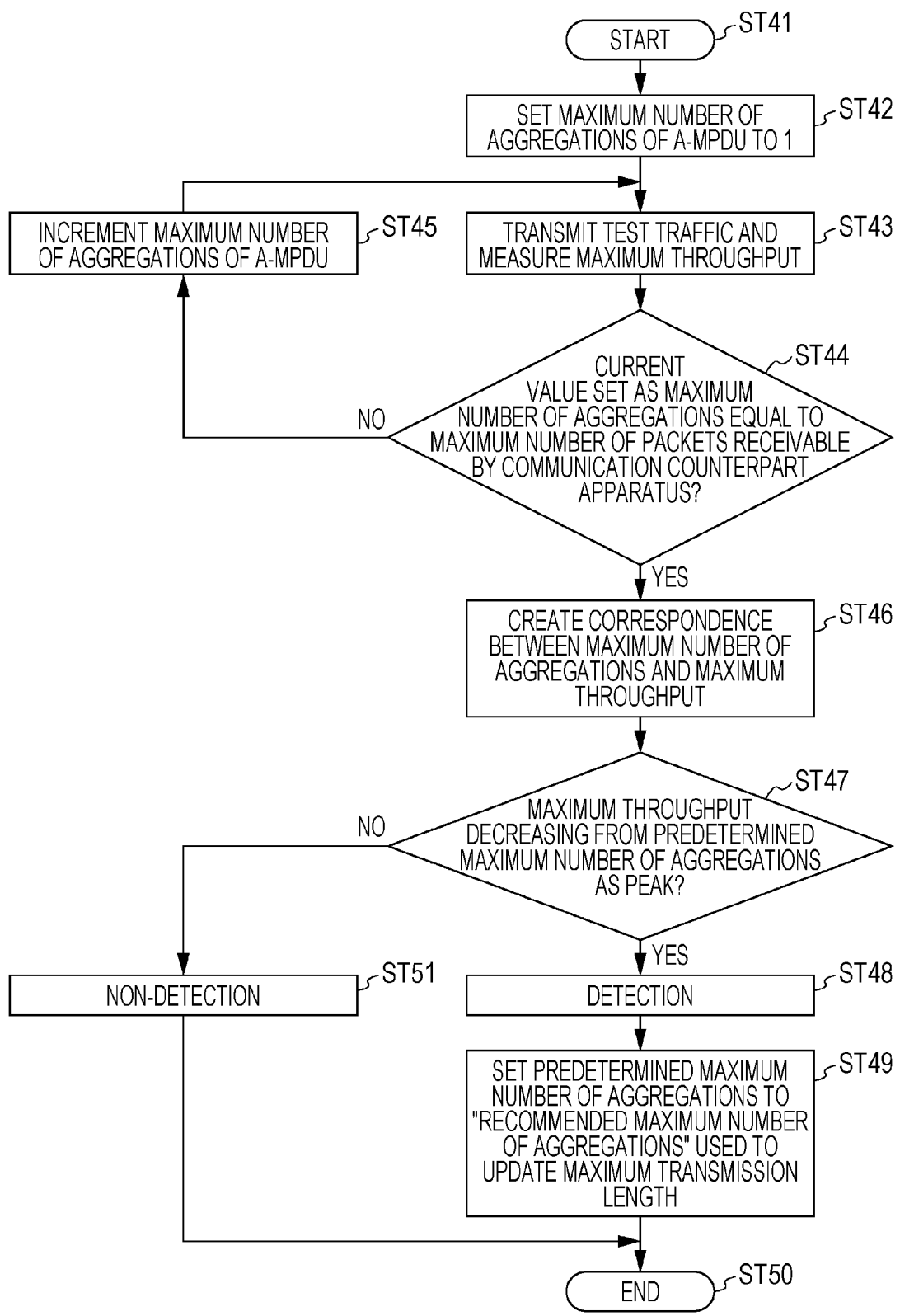
FIG. 18 is a flowchart illustrating a procedure of a process for detecting fast fading using a detection technique A (detection based on the correspondence between the maximum transmission length and the maximum throughput).

FIG. 18 is a flowchart illustrating a procedure of a detection process of the controller 101 in the case of "subject transmission". In step ST41, the controller 101 starts a fast fading detection process, and then proceeds to the processing of step ST42. In step ST42, the controller 101 sets the maximum number of aggregations in A-MPDU to 1.

Then, in step ST43, the controller 101 transmits test traffic (data frame), and measures maximum throughput. Then, in step ST44, the controller 101 determines whether or not the current value set as the maximum number of aggregations is equal to the maximum number of packets receivable by the communication counterpart apparatus (counterpart apparatus).

When the current value is not equal to the maximum number of packets receivable, in step ST45, the controller 101 increases (increments) the maximum number of aggregations in A-MPDU by one, and then returns to the processing of step ST43, in which test traffic (data frame) is transmitted and maximum throughput is measured. On the other hand, when the current value is equal to the maximum number of packets receivable, the controller 101 proceeds to the processing of step ST46.

In step ST46, the controller 101 creates a correspondence between the maximum number of aggregations and the maximum throughput (see FIGS. 8 and 9). Then, in step ST47, the controller 101 determines whether or not the maximum throughput decreases from a predetermined maximum number of aggregations as a peak in the correspondence created in step ST46.

When the maximum throughput decreases, in step ST48, the controller 101 determines "detection of fast fading". Then, in step ST49, the controller 101 sets the predetermined maximum number of aggregations to "the recommended maximum number of aggregations" which is used to update the maximum transmission length of the data frame. After the processing of step ST49, in step ST50, the controller 101 ends the detection process.

Further, when there is no predetermined maximum number of aggregations from which the maximum throughput decreases in step ST47, in step ST51, the controller 101 determines "non-detection of fast fading". Then, after the processing of step ST51, in step ST50, the controller 101 ends the detection process.

In the flowchart of FIG. 18, fast fading can also be detected using, instead of "the maximum number of aggregations in A-MPDU", "the maximum number of A-MSDUs combined (the maximum number of aggregations in A-MSDU)" corresponding to the length of "the maximum number of aggregations in A-MPDU", "the maximum frame length", or "the maximum transmission time of the data frame".

Further, when "the maximum number of aggregations in A-MPDU" is used, in step ST49, "the recommended maximum number of aggregations" that is used to update the maximum transmission length of the data frame is obtained. Likewise, when "the maximum number of A-MSDUs combined", "the maximum frame length", or "the maximum transmission time of the data frame" is used instead, in step ST49, "the recommended maximum number of A-MSDUs combined", "the recommended maximum frame length", or "the recommended maximum transmission time of the data frame" that is used to update the maximum transmission length of the data frame is obtained.

While in the detection process illustrated in the flowchart of FIG. 18, a procedure of the detection process of the controller 101 in the case of "subject transmission" is illustrated, a procedure of a detection process of the controller 101 in the case of "subject reception" is also performed in a similar manner. In this regard, in step ST44, "maximum number of packets receivable by communication counterpart apparatus?" is replaced with "maximum number of packets receivable by subject apparatus?".

In the detection process illustrated in the flowchart of FIG. 18, furthermore, maximum throughput is measured by sequentially changing the value set as the maximum number of aggregations from 1 to the maximum number of packets receivable, and the correspondence between the maximum number of aggregations and the maximum throughput is created. Then, the presence of fast fading is determined based on the created correspondence. However, if it is found that the maximum throughput has decreased from a predetermined maximum number of aggregations as a peak, the subsequent measurement of maximum throughput with respect to the maximum number of aggregations is not necessary, and can be omitted.

Figure 19:
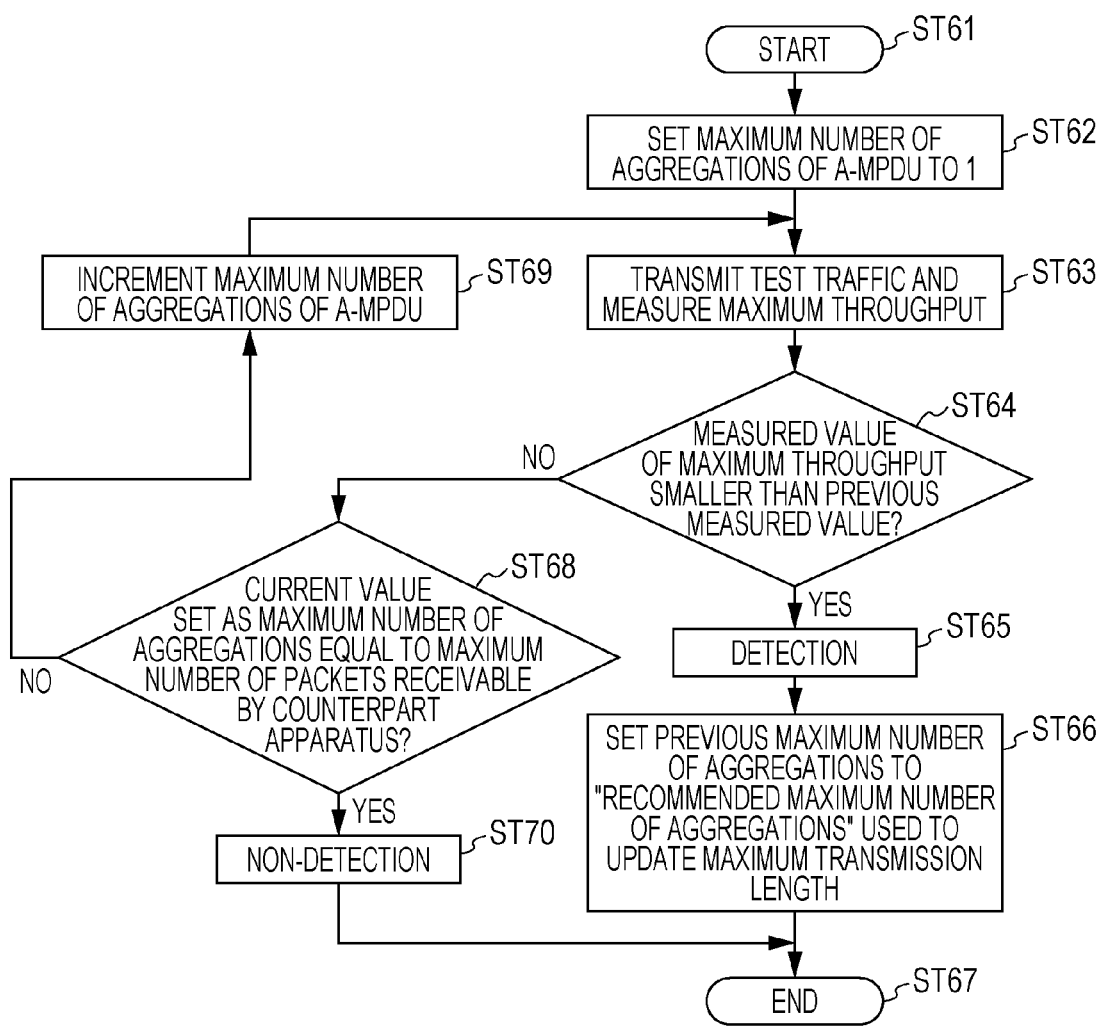
FIG. 19 is a flowchart illustrating another procedure of the process for detecting fast fading using the detection technique A (detection based on the correspondence between the maximum transmission length and the maximum throughput).

FIG. 19 is a flowchart illustrating a procedure of a detection process performed in the above case. In step ST61, the controller 101 starts a fast fading detection process, and then proceeds to the processing of step ST62. In step ST62, the controller 101 sets the maximum number of aggregations in A-MPDU to 1.

Then, in step ST63, the controller 101 transmits test traffic (data frame), and measures maximum throughput. Then, in step ST64, the controller 101 determines whether or not the measured value of maximum throughput is smaller than the previous measured value.

When the measured value of maximum throughput is smaller than the previous measured value, in step ST65, the controller 101 determines "detection of fast fading". Then, in step ST66, the controller 101 sets the previous maximum number of aggregations to "the recommended maximum number of aggregations" which is used to update the maximum transmission length of the data frame. After the processing of step ST66, in step ST67, the controller 101 ends the detection process.

When the measured value of maximum throughput is not smaller than the previous measured value in step ST64, the controller 101 proceeds to the processing of step ST68. In step ST68, it is determined whether or not the current value set as the maximum number of aggregations is equal to the maximum number of packets receivable by the communication counterpart apparatus (counterpart apparatus).

When the current value is not equal to the maximum number of packets receivable, in step ST69, the controller 101 increases (increments) the maximum number of aggregations in A-MPDU by one, and then returns to the processing of step ST63, in which test traffic (data frame) is transmitted and maximum throughput is measured. On the other hand, when the current value is equal to the maximum number of packets receivable, in step ST70, the controller 101 determines "non-detection of fast fading". Then, after the processing of step ST70, in step ST67, the controller 101 ends the detection process.

"Detection technique B: detection based on the correspondence between the signal-to-noise ratio (SNR) and the packet error rate (PER)"

In this detection technique, a packet error rate is estimated from a measured signal-to-noise ratio (SNR), using the relationship between a signal-to-noise ratio (SNR) and a packet error rate (PER) under conditions of no fast fading. Then, in this detection technique, fast fading is detected based on a result of comparison between the estimated packet error rate and the measured packet error rate.

This detection technique utilizes a phenomenon that transmission characteristics greatly change depending on whether fast fading, for example, fluorescent lamp fading, has occurred, whereas the mean signal-to-noise ratio does not so greatly change. In this detection technique, it is determined that fast fading has occurred when the measured packet error rate is higher than the estimated packet error rate.

Figure 20:
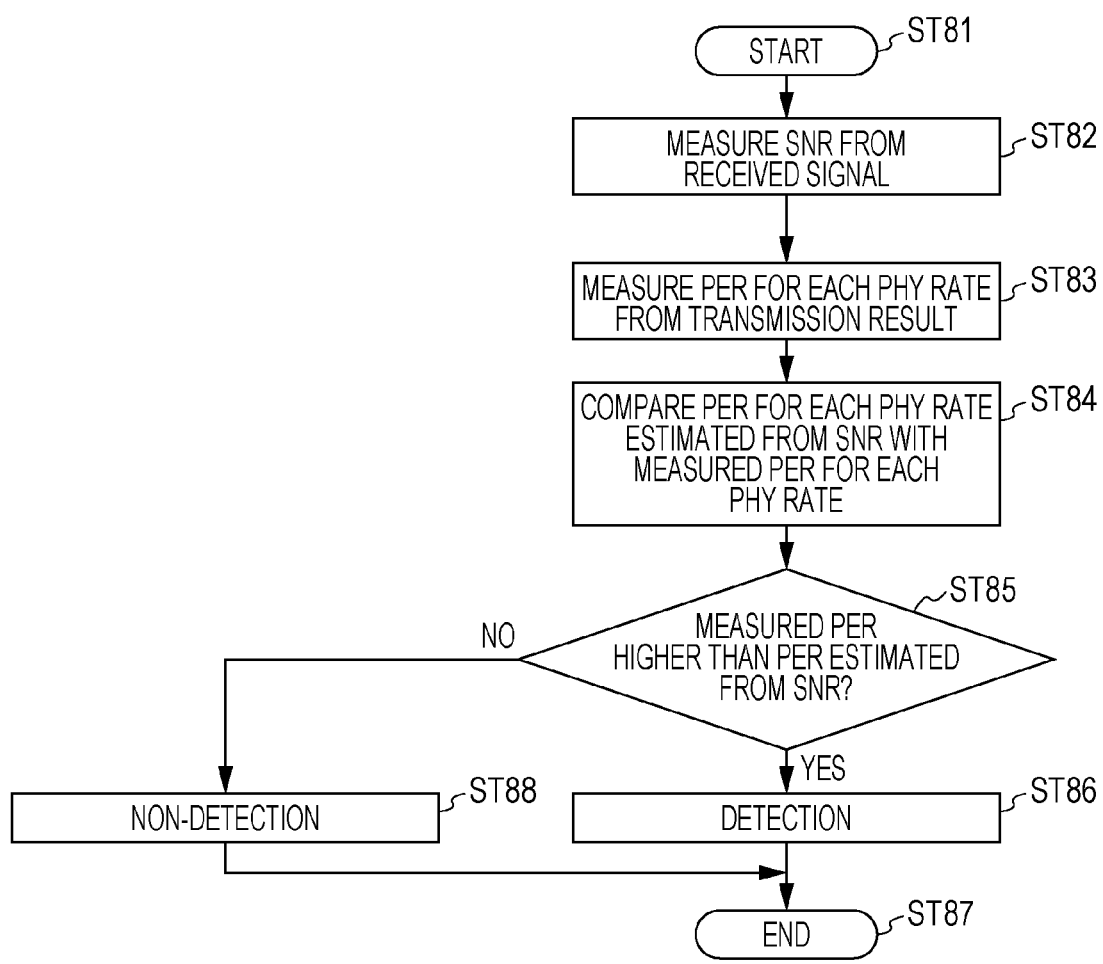
FIG. 20 is a flowchart illustrating a procedure of a process for detecting fast fading using a detection technique B (detection based on the correspondence between the signal-to-noise ratio (SNR) and the packet error rate (PER)).

FIG. 20 is a flowchart illustrating a procedure of a detection process of the controller 101 in the case of "subject transmission". In step ST81, the controller 101 starts a fast fading detection process, and then proceeds to the processing of step ST82. In step ST82, the controller 101 measures the signal-to-noise ratio (SNR) from a signal received from the communication counterpart apparatus (counterpart apparatus).

Then, in step ST83, the controller 101 measures a packet error rate (PER) for each PHY rate from the transmission result of the data frame. Then, in step ST84, the controller 101 compares the PER for each PHY rate, which has been estimated from the measured SNR, with the measured PER for each PHY rate. It is to be noted that the controller 101 holds, for each PHY rate, the relationship between the signal-to-noise ratio (SNR) and the packet error rate (PER) under conditions of no fast fading. The controller 101 estimates the PER for each PHY rate from the measured SNR using the held relationship.

Then, in step ST85, the controller 101 determines whether or not the measured PER (PER1) is higher than the PER (PER2) estimated from the measured SNR. When the PER1 is higher than the PER2, in step ST86, the controller 101 determines "detection of fast fading". Then, after the processing of step ST86, in step ST87, the controller 101 ends the detection process. On the other hand, when the PER1 is not higher than the PER2 in step ST85, in step ST88, the controller 101 determines "non-detection of fast fading". Then, after the processing of step ST88, in step ST87, the controller 101 ends the detection process.

While in the detection process illustrated in the flowchart of FIG. 20, a procedure of the detection process of the controller 101 in the case of "subject transmission" is illustrated, a procedure of a detection process of the controller 101 in the case of "subject reception" is also performed in a similar manner. In this regard, in step ST83, "from transmission result" is replaced with "from reception result".

"Detection Technique C: Detection Based on Changes in Packet Error Rate (PER)"

In this detection technique, fast fading is detected based on a measured packet error rate (PER) of a packet at an individual position in an A-MPDU data frame.

Figure 21:
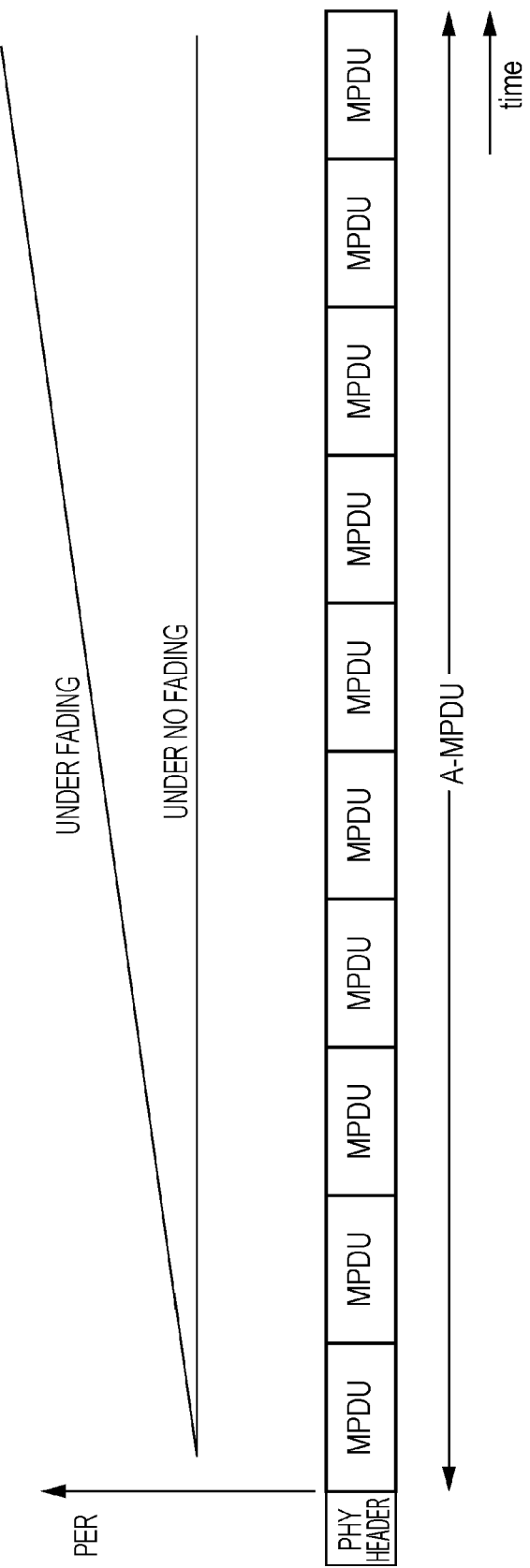
FIG. 21 is a diagram illustrating the phenomenon that, in an A-MPDU data frame, an MPDU (packet) located nearer the end of the data frame has a higher packet error rate (PER) when fast fading has occurred.

This detection technique utilizes a phenomenon that, as illustrated in FIG. 21, an MPDU (packet) nearer the end of the data frame has a higher packet error rate (PER) when fast fading, for example, fluorescent lamp fading, has occurred. In this detection technique, it is determined that fast fading has occurred when a packet nearer the end of the data frame has a higher packet error rate.

Figure 22:
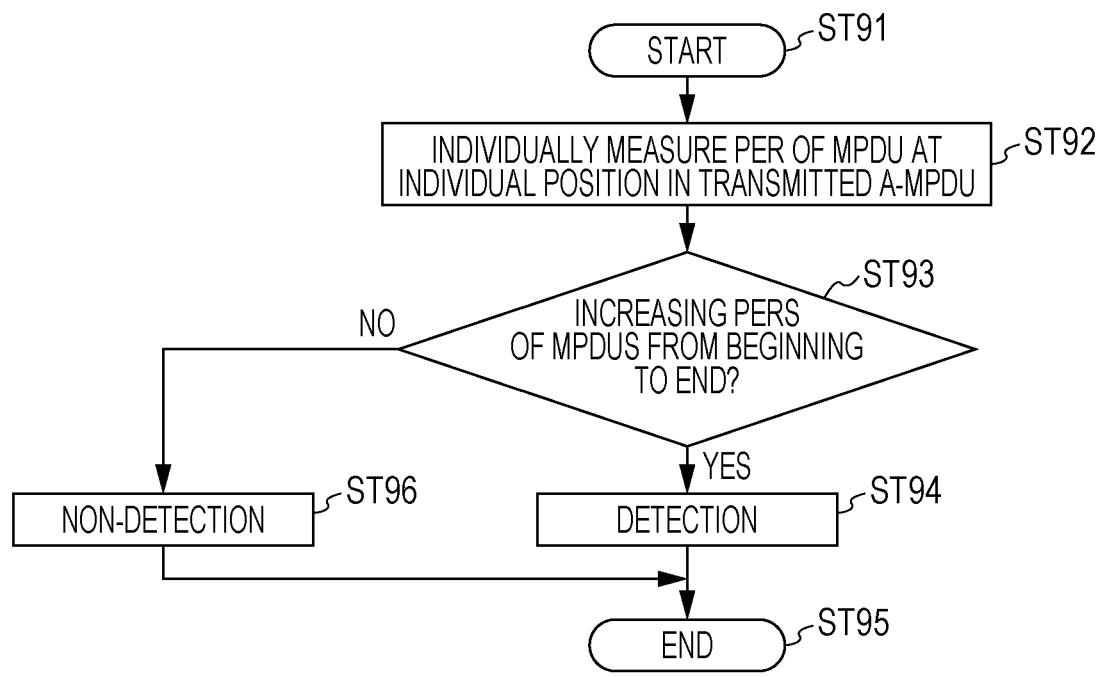
FIG. 22 is a flowchart illustrating a procedure of a process for detecting fast fading using a detection technique C (detection based on changes in packet error rate (PER)).

FIG. 22 is a flowchart illustrating a procedure of a detection process of the controller 101 in the case of "subject transmission". In step ST91, the controller 101 starts the fast fading detection process, and then proceeds to the processing of step ST92. In step ST92, the controller 101 individually measures the packet error rate (PER) of an MPDU (packet) located at an individual position in a transmitted A-MPDU frame.

Then, in step ST93, the controller 101 determines whether or not the packet error rates (PERs) of the MPDUs increase from the beginning to the end of the frame. When the packet error rates (PERs) of the MPDUs increase from the beginning to the end of the frame, in step ST94, the controller 101 determines "detection of fast fading". Then, after the processing of step ST94, in step ST95, the controller 101 ends the detection process. On the other hand, when the packet error rates (PERs) of the MPDUs do not increase from the beginning to the end of the frame in step ST93, in step ST96, the controller 101 determines "non-detection of fast fading". Then, after the processing of step ST96, in step ST95, the controller 101 ends the detection process.

While in the detection process illustrated in the flowchart of FIG. 22, a procedure of the detection process of the controller 101 in the case of "subject transmission" is illustrated, a procedure of a detection process of the controller 101 in the case of "subject reception" is also performed in a similar manner. In this regard, in step ST92, "individual position in transmitted A-MPDU" is replaced with "individual position in received A-MPDU". Furthermore, this fast fading detection technique is applicable to an A-MPDU frame but is not applicable to an A-MSDU frame in which the entire frame forms a single MPDU.

"Detection Technique D: Detection Based on Changes in a Pilot Signal"

Figure 23:
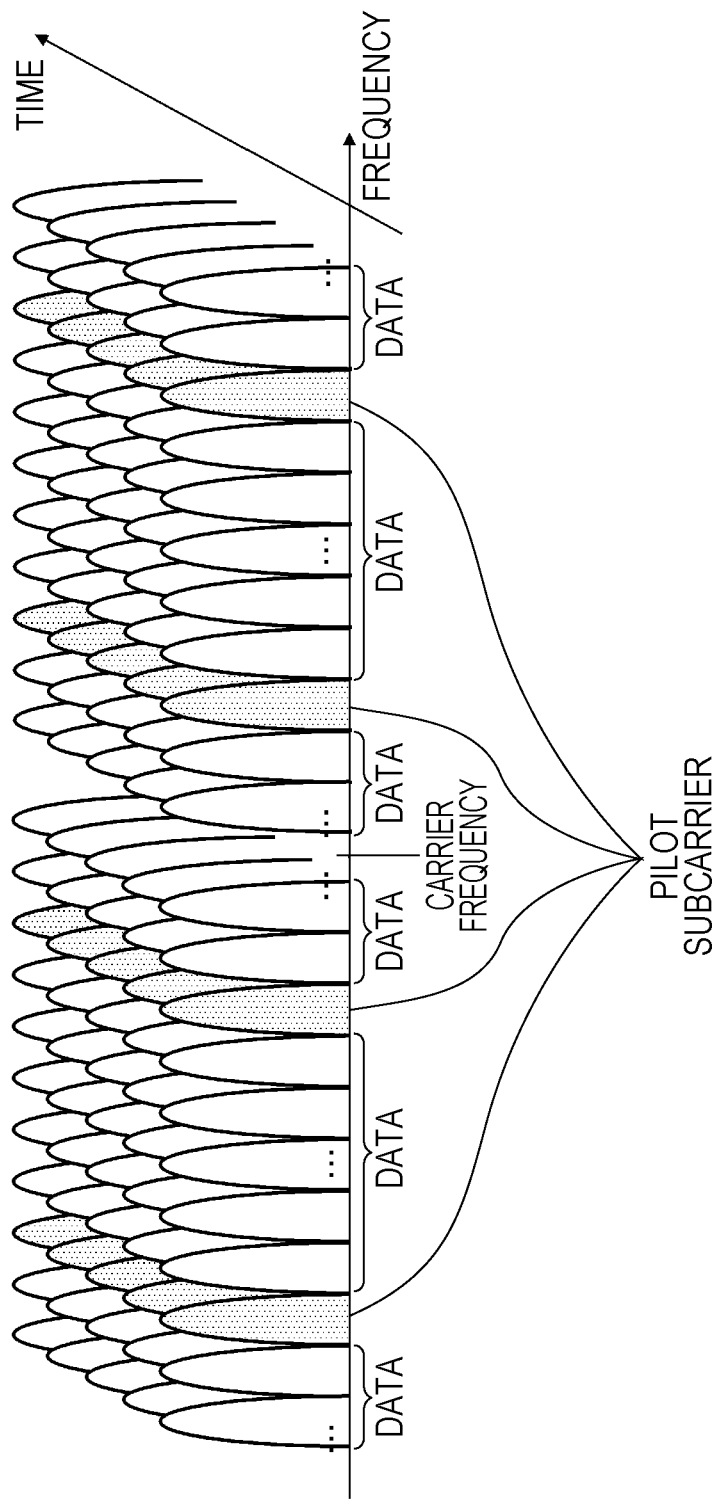
FIG. 23 is a diagram illustrating a pilot signal that is a given signal continuously transmitted via a specific subcarrier separately from data.

In this detection technique, fast fading is detected based on changes in a pilot signal, which are measured over an entire received data frame. As illustrated in FIG. 23, a pilot signal is a given signal that is continuously transmitted via a specific subcarrier separately from data. This detection technique utilizes a phenomenon that a pilot signal greatly changes when fast fading, for example, fluorescent lamp fading, has occurred. In this detection technique, it is determined that fast fading has occurred when a pilot signal changes greatly from the beginning to the end of a received data frame.

Figure 24:
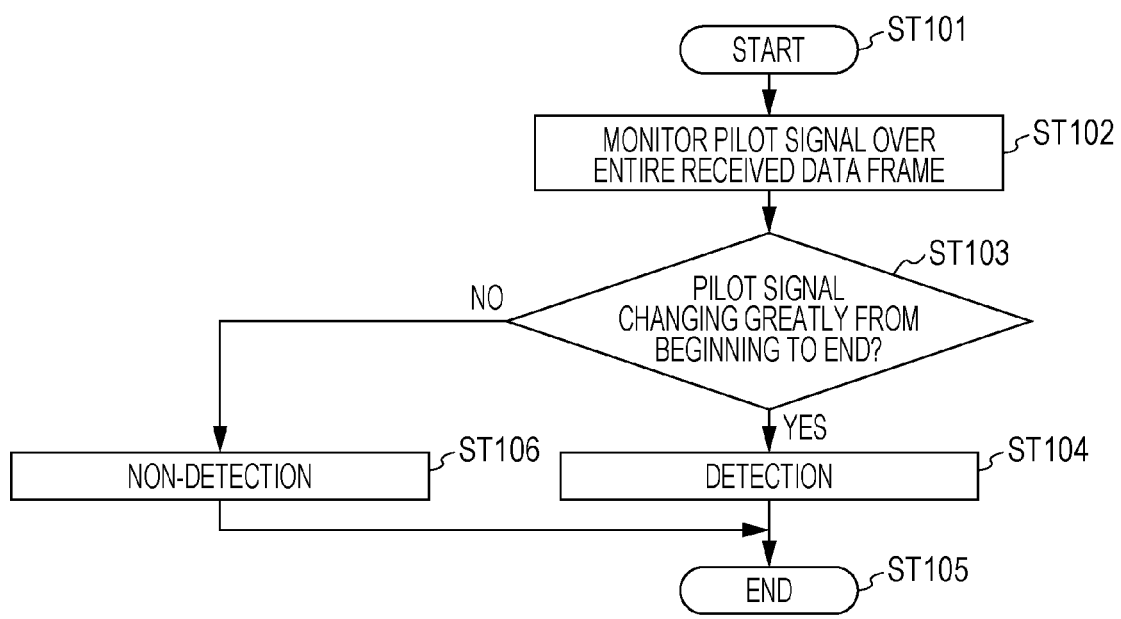
FIG. 24 is a flowchart of a procedure of a process for detecting fast fading using a detection technique D (detection based on changes in a pilot signal).

FIG. 24 is a flowchart illustrating a procedure of a detection process of the controller 101 in the cases of "subject transmission" and "subject reception". In step ST101, the controller 101 starts the fast fading detection process, and then proceeds to the processing of step ST102. In step ST102, the controller 101 monitors a pilot signal over an entire received data frame.

Then, in step ST103, the controller 101 determines whether or not the pilot signal changes greatly from the beginning to the end of the received data frame. When the pilot signals change greatly from the beginning to the end of the received data frame, in step ST104, the controller 101 determines "detection of fast fading". Then, after the processing of step ST104, in step ST105, the controller 101 ends the detection process. On the other hand, when the pilot signal does not change greatly in step ST103, in step ST106, the controller 101 determines "non-detection of fast fading". Then, after the processing of step ST106, in step ST105, the controller 101 ends the detection process.

"Detection Technique E: Detection Based on Changes of Path Metrics"

In this detection technique, fast fading is detected based on a path metric obtained in the Viterbi decoding of each packet (for example, each MPDU in A-MPDU) of a received data frame. In Viterbi decoding, which is maximum likelihood decoding for decoding convolutional codes, decoding is performed by retrieving the "most likely" sequence among candidates. A path metric is an index of "likelihood", and the smaller the value, the higher the "likelihood". If the value of the finally adopted minimum path metric is large, this means that the characteristics are poor.

This detection technique utilizes a phenomenon that a path metric adopted is lower for a packet near the end of a received data frame when fast fading, for example, fluorescent lamp fading, has occurred. In this detection technique, it is determined that fast fading has occurred when a path metric adopted is lower for a packet nearer the end of a received data frame.

Figure 25:
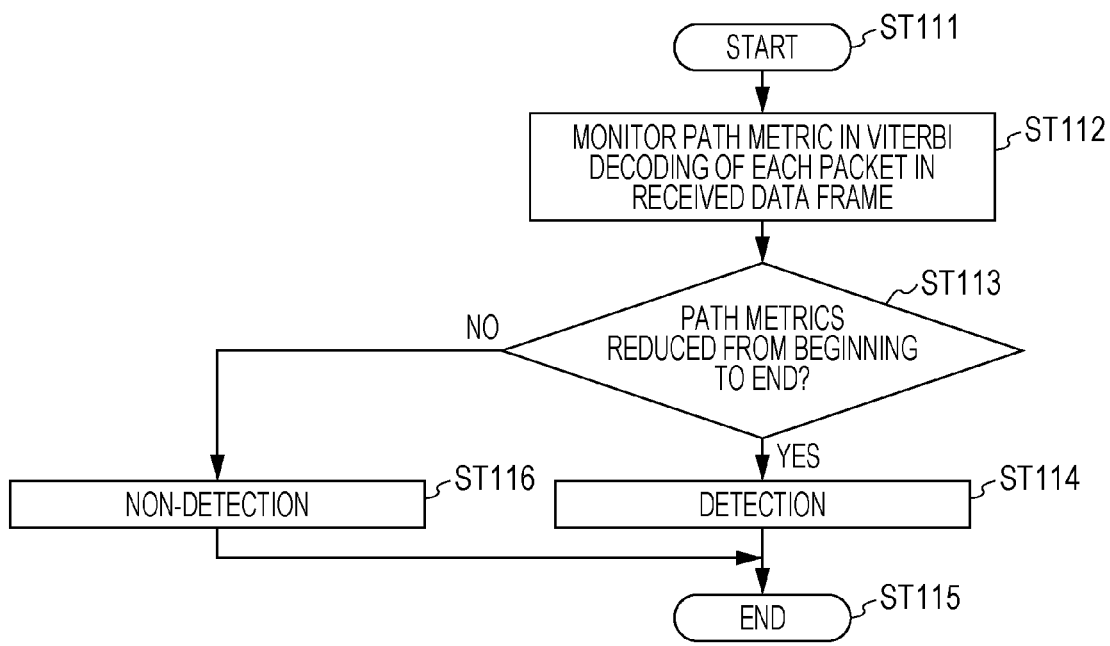
FIG. 25 is a flowchart of a procedure of a process for detecting fast fading using a detection technique E (detection based on changes of path metrics).

FIG. 25 is a flowchart illustrating a procedure of a detection process of the controller 101 in the cases of "subject transmission" and "subject reception". In step ST111, the controller 101 starts a fast fading detection process, and then proceeds to the processing of step ST112. In step ST112, the controller 101 monitors a path metric in the Viterbi decoding of each packet (for example, each MPDU in A-MPDU) of a received data frame.

Then, in step ST113, the controller 101 determines whether or not the path metrics from the beginning to the end of the received data frame are reduced. When the path metrics from the beginning to the end are reduced, in step ST114, the controller 101 determines "detection of fast fading". Then, after the processing of step ST114, in step ST115, the controller 101 ends the detection process. On the other hand, when the path metrics are not reduced in step ST113, in step ST116, the controller 101 determines "non-detection of fast fading". Then, after the processing of step ST116, in step ST115, the controller 101 ends the detection process.

"Detection Technique F: Detection Based on Changes in Bit Error Rate (BER)"

In this detection technique, fast fading is detected based on a measured bit error rate (BER) of each of a plurality of blocks into which an entire received data frame is divided. The bit error rate (BER) is the number of error bits in the physical layer, and may be an index that most correlatively represents the actual characteristics.

This detection technique utilizes a phenomenon that a block nearer the end of the received data frame has a higher bit error rate when fast fading, for example, fluorescent lamp fading, has occurred. In this detection technique, it is determined that fast fading has occurred when a block nearer the end of the received data frame has a higher bit error rate.

Figure 26:
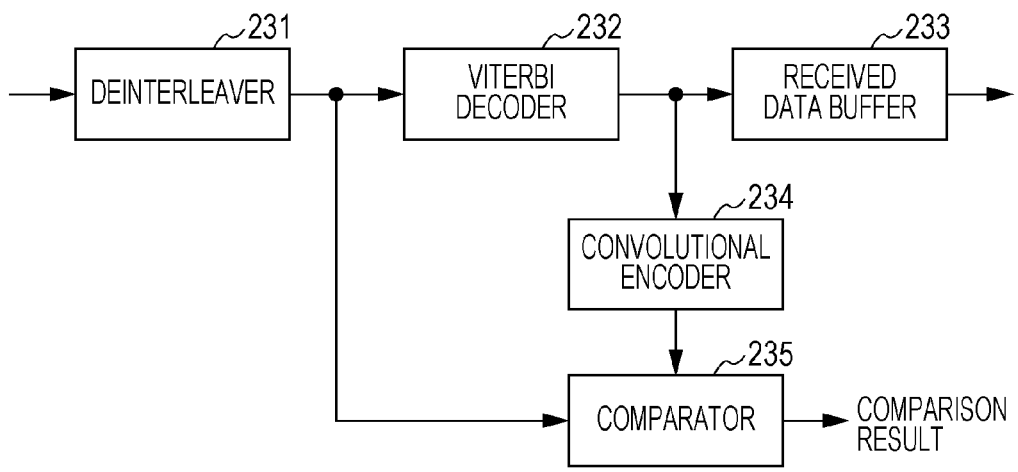
FIG. 26 is a block diagram illustrating an example of an additional configuration of the receiver system (relating to the physical layer) in the wireless communication apparatus for measuring a bit error rate (BER).

FIG. 26 illustrates an example of a configuration that is added to the receiver system (relating to the physical layer) (see FIG. 5) in the wireless communication apparatus 100 to measure a bit error rate (BER). In FIG. 26, elements corresponding to those in FIG. 5 are assigned the same numerals. The receiver system further includes a convolutional encoder 234 and a comparator 235.

The convolutional encoder 234 convolutionally encodes a bit sequence that has been error-corrected using Viterbi decoding by the Viterbi decoder 232 once again to generate convolutional encoded data. The convolutional encoder 234 is similar to the convolutional encoder 202 (see FIG. 3) in the transmitter system (relating to the physical layer) in the wireless communication apparatus 100. The comparator 235 compares, bit-by-bit, the bit sequence obtained before Viterbi decoding, which is output from the deinterleaver 231, with the bit sequence generated by the convolutional encoder 234. In accordance with the comparison results of the comparator 235, individual error bits can be detected in the received data frame. Therefore, the bit error rate (BER) of each of a plurality of blocks into which an entire received data frame is divided can be measured.

Figure 27:
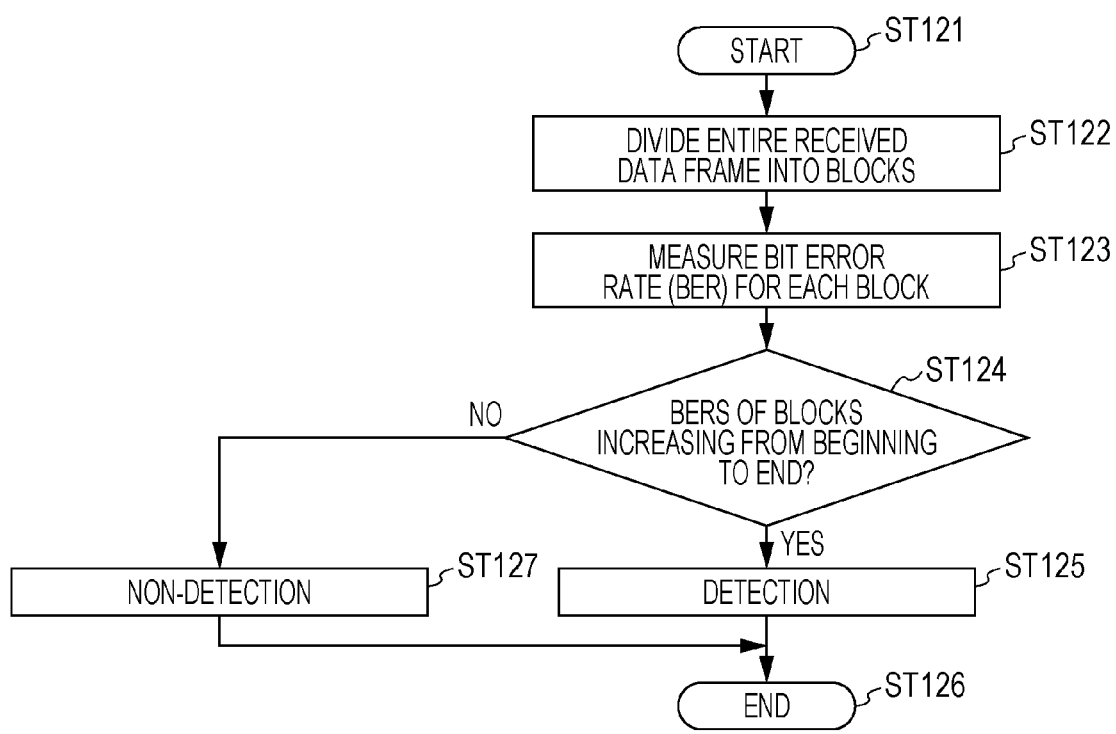
FIG. 27 is a flowchart illustrating a procedure of a process for detecting fast fading using a detection technique F (detection based on changes in bit error rate (BER)).

FIG. 27 is a flowchart illustrating a procedure of a detection process of the controller 101 in the cases of "subject transmission" and "subject reception". In step ST121, the controller 101 starts a fast fading detection process, and then proceeds to the processing of step ST122. In step ST122, the controller 101 divides an entire received data frame into a plurality of blocks.

Then, in step ST123, the controller 101 measures the bit error rate (BER) for each block. Then, in step ST124, the controller 101 determines whether or not the bit error rates (BERs) increase from the beginning to the end of the received data frame.

When the bit error rates (BERs) increase, in step ST125, the controller 101 determines "detection of fast fading". Then, after the processing of step ST125, in step ST126, the controller 101 ends the detection process. On the other hand, when the bit error rates (BERs) do not increase in step ST124, in step ST127, the controller 101 determines "non-detection of fast fading". Then, after the processing of step ST127, in step ST126, the controller 101 ends the detection process.

Features of the detection techniques described above will be described briefly. The detection technique A (detection based on the correspondence between the maximum transmission length and the maximum throughput) is the most straightforward to implement because it does not depend on devices. However, it is necessary to transmit high-load probe traffic other than the original application in order to collect data. The detection technique B (detection based on the correspondence between the signal-to-noise ratio (SNR) and the packet error rate (PER)) can be adopted while the application is being used. However, it is necessary to also create the relationship between the SNR and the PER in advance under conditions of no fast fading.

The detection technique C (detection based on changes in packet error rate (PER)) does not need SNR information but needs the management of the PERs at the individual packet positions. The detection technique D (detection based on changes in a pilot signal) provides higher accuracy than the detection techniques A to C, but is time-consuming to implement. The detection technique E (detection based on changes of path metrics) provides higher accuracy than the detection technique D, but is more difficult to implement. The detection technique F (detection based on changes in bit error rate (BER)) provides the highest accuracy, but is the most time-consuming to implement.

Figure 28:
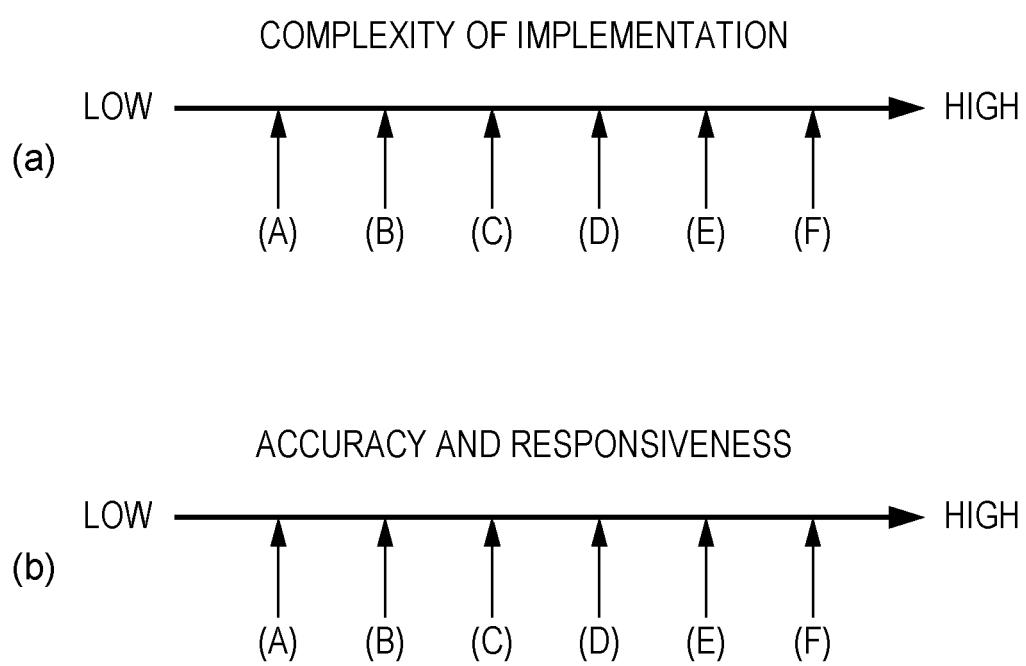
FIG. 28 includes diagrams illustrating the fast fading detection techniques A to F which are arranged in order in terms of complexity of implementation and in terms of accuracy and responsiveness.
Figure 29:
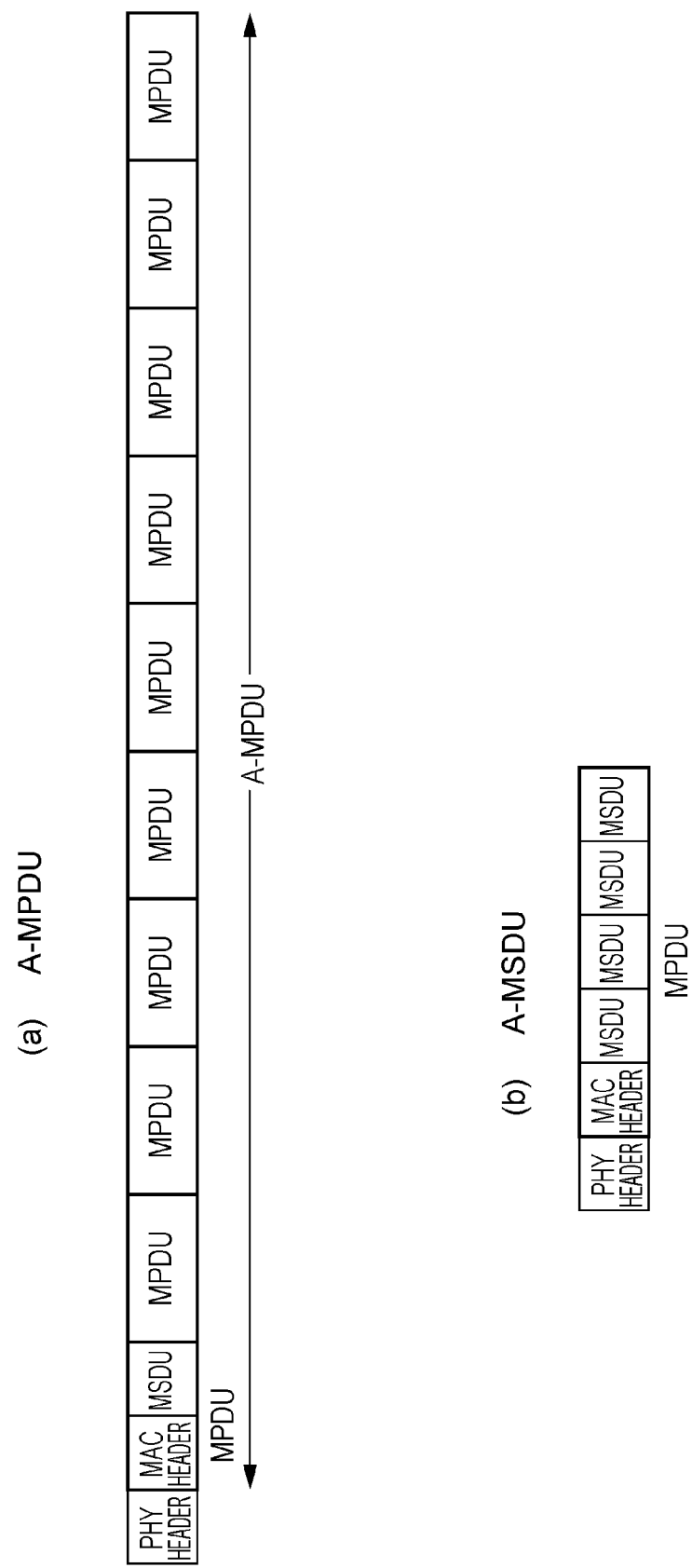
FIG. 29 includes diagrams illustrating frame aggregation standardized as a MAC layer function in IEEE 802.11n.
Figure 30:
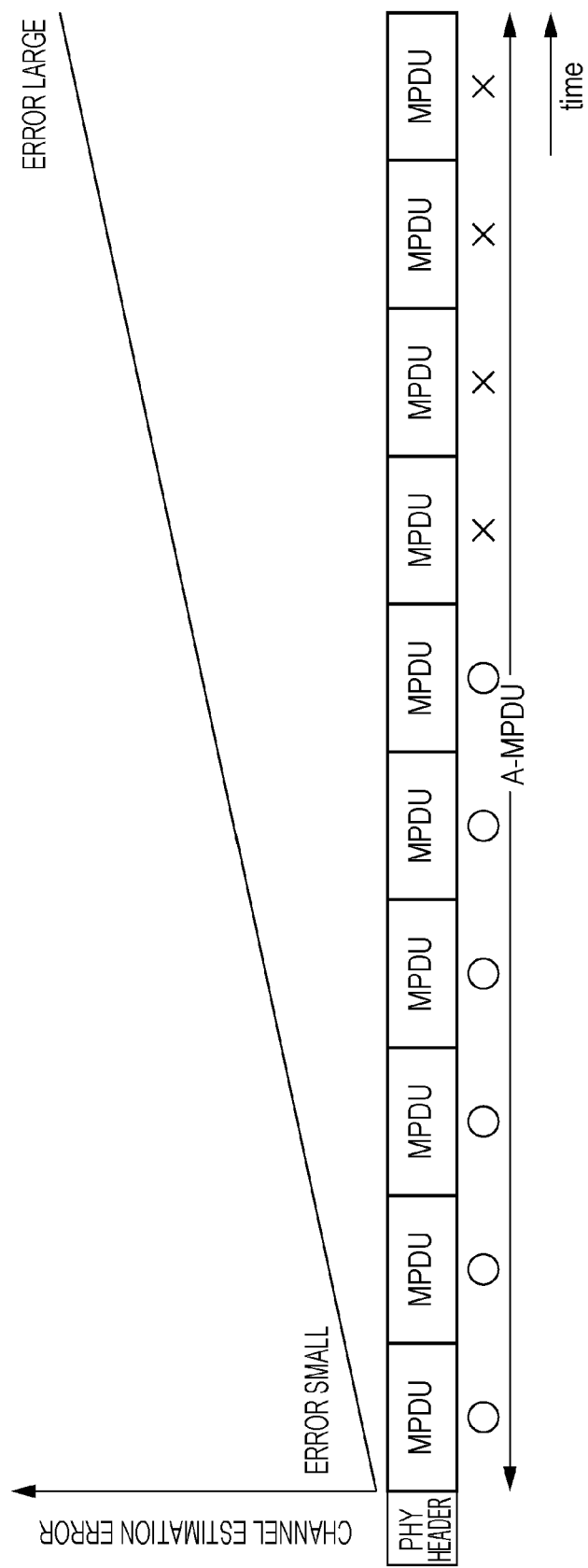
FIG. 30 is a diagram illustrating how characteristic degradation of frame aggregation is caused by fast fading.

FIG. 28(*a*) illustrates the detection techniques A to F described above, which are arranged in order in terms of the complexity of implementation, and the complexity of implementation increases in order from the detection technique A to the detection technique F. FIG. 28(*b*) illustrates the detection techniques A to F described above, which are arranged in order in terms of accuracy and responsiveness, and the accuracy and responsiveness increase in order from the detection technique A to the detection technique F.

INDUSTRIAL APPLICABILITY

The present invention can prevent or reduce the degradation in transmission characteristics caused by fast fading to achieve optimized throughput, and can be applied to a wireless communication apparatus etc., in a high-speed wireless LAN (Local Area Network) system.

REFERENCE SIGNS LIST

10: communication system
100, 100A, 100B: wireless communication apparatus
101: controller
102: user operation unit
103: display unit
104: data processor
105: transmission processor
106: wireless interface unit
110: optical demodulator
201: transmission data buffer
202: convolutional encoder
203: interleaver
104: distributer
205: mapper
206: OFDM modulator
107: guard interval inserter
208: wireless transmitter
211: serial/parallel converter
212-1 to 212-*n*: subcarrier modulator
213: inverse fast Fourier transform unit
221: wireless receiver
222: guard interval remover
223: fast Fourier transform unit
224: MIMO signal receiver
225: demodulator
226: channel matrix estimator
227: channel matrix processor
228: subcarrier demodulator
229: demapper
230: combiner
231: deinterleaver
232: Viterbi decoder
233: received data buffer

The invention claimed is:

1. A wireless communication apparatus comprising:
a data transmitter that wirelessly transmits a data frame to a communication counterpart apparatus, the data frame being configured by combining a plurality of packets in accordance with A-MPDU (Aggregate MAC Protocol Data Unit) type of packet aggregation or A-MSDU (Aggregate MAC Service Data Unit) type of packet aggregation; and
a data frame limiter that
(i) detects whether fast fading is present, wherein the fast fading is detected based on measured maximum throughput with respect to maximum transmission length receivable at the communication counterpart apparatus, the measured maximum throughput being obtained by transmitting a test data frame and sequentially increasing a maximum number of aggregations until the maximum transmission length receivable at the communication counterpart apparatus is determined, and wherein detecting whether fast fading is present occurs when a subsequent measured throughput is less than the measured maximum throughput, and
(ii) in the event a detection result thereof indicates that the fast fading is present, performs a frame length update process in which a maximum number of packets of the data frame transmitted by the data transmitter is changed to a recommended maximum number, and in the event the detection result thereof indicates that the fast fading is not present, does not perform the frame length update process.

2. The wireless communication apparatus according to claim 1, wherein the fast fading is fading caused by a fluorescent lamp that discharges with a frequency of occurrence that is twice a frequency of an alternating current power supply.

3. The wireless communication apparatus according to claim 2, wherein the fast fading is detected by detecting a variable light source having a frequency that is twice the frequency of the alternating current power supply using an optical demodulator that uses a photoelectric conversion element.

4. The wireless communication apparatus according to claim 1, wherein the fast fading is detected using a measured signal-to-noise ratio, in accordance with a result of comparison between a packet error rate estimated using a relationship between a signal-to-noise ratio and a packet error rate under conditions of no fast fading and a measured packet error rate.

5. The wireless communication apparatus according to claim 1, wherein the fast fading is detected based on a measured packet error rate of a packet at an individual position in the data frame.

6. The wireless communication apparatus according to claim 1, wherein the data transmitter transmits the data frame using a multi-carrier method, and the fast fading is detected based on a change in a pilot signal which is monitored over the entirety of a received data frame.

7. The wireless communication apparatus according to claim 1, wherein data included in the packets has been convolutionally encoded, and the fast fading is detected based on a path metric obtained in Viterbi decoding of each packet in a received data frame.

8. The wireless communication apparatus according to claim 1, wherein the fast fading is detected based on a measured bit error rate of each of a plurality of blocks into which a received data frame is divided.

9. The wireless communication apparatus according to claim 1, wherein the data frame limiter enables the recommended maximum number of packets of the data frame to be changed by a user operation.

10. A wireless communication method comprising:
a data transmitting step of wirelessly transmitting a data frame to a communication counterpart apparatus, the data frame being configured by combining a plurality of packets in accordance with A-MPDU (Aggregate MAC Protocol Data Unit) type of packet aggregation or A-MSDU (Aggregate MAC Service Data Unit) type of packet aggregation; and
a data frame limiting step of detecting whether fast fading is present, wherein detecting the fast fading is based on measured maximum throughput with respect to maximum transmission length receivable at the communication counterpart apparatus, the measured maximum throughput obtained by transmitting a test data frame and sequentially increasing a maximum number of aggregations until the maximum transmission length receivable at the communication counterpart apparatus is determined, and wherein fast fading is detected when a subsequent measured throughput is less than the measured maximum throughput,
in the event a detection result thereof indicates that the fast fading is present, performing a frame length update process in which a maximum number of packets of the data frame transmitted by the data transmitter is changed to a recommended maximum number, and
in the event the detection result thereof indicates that the fast fading is not present, not performing the frame length update process.

* * * * *